(12) United States Patent
Avestimehr et al.

(10) Patent No.: US 10,200,873 B2
(45) Date of Patent: Feb. 5, 2019

(54) SPECTRUM SHARING IN DEVICE-TO-DEVICE COMMUNICATION SYSTEMS

(71) Applicant: Cornell University, Ithaca, NY (US)

(72) Inventors: Amir Salman Avestimehr, Rancho Palos Verdes, CA (US); Navid Naderializadeh, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 15/038,433

(22) PCT Filed: Nov. 24, 2014

(86) PCT No.: PCT/US2014/067192
§ 371 (c)(1),
(2) Date: May 20, 2016

(87) PCT Pub. No.: WO2015/077731
PCT Pub. Date: May 28, 2015

(65) Prior Publication Data
US 2016/0295419 A1    Oct. 6, 2016

Related U.S. Application Data

(60) Provisional application No. 61/908,005, filed on Nov. 22, 2013.

(51) Int. Cl.
*H04W 16/14*    (2009.01)
*H04W 72/12*    (2009.01)

(52) U.S. Cl.
CPC ....... *H04W 16/14* (2013.01); *H04W 72/1231* (2013.01); *H04W 72/1242* (2013.01)

(58) Field of Classification Search
None
See application file for complete search history.

(56) References Cited

U.S. PATENT DOCUMENTS

| 8,325,621 | B2 * | 12/2012 | Simonsson | ........... | H04W 52/40 |
| | | | | | 370/252 |
| 2008/0045260 | A1 * | 2/2008 | Muharemovic | ..... | H04W 52/286 |
| | | | | | 455/522 |

(Continued)

FOREIGN PATENT DOCUMENTS

| WO | 2011053807 A1 | 5/2011 |
| WO | 2015077731 A1 | 5/2015 |

OTHER PUBLICATIONS

Yang, J. R., Authorized Officer, Korean Intellectual Property Office, International Search Report and Written Opinion, PCT/US2014/067192, dated Feb. 27, 2015, 9 pages.

(Continued)

*Primary Examiner* — Charles N Appiah
*Assistant Examiner* — Frank E Donado
(74) *Attorney, Agent, or Firm* — Perkins Coie LLP

(57) ABSTRACT

A method for managing spectrum sharing in a wireless communication network includes identifying a set of users in the wireless communication network which shares a spectrum of communication, classifying the set of users into multiple subsets of users, and scheduling, within a given time slot, one subset of users among the multiple subsets of users to transmit and receive data at the same time so that the scheduled subset of users shares the spectrum of communication. The users in a subset are selected by comparing the desired channel strength with the sum of strengths of the strongest interference from that user and the strongest interference to that user, all values in dB scale.

20 Claims, 22 Drawing Sheets

(56) References Cited

U.S. PATENT DOCUMENTS

| | | | |
|---|---|---|---|
| 2009/0247175 | A1 | 10/2009 | Van Rensburg et al. |
| 2009/0262676 | A1 | 10/2009 | Labbe et al. |
| 2011/0111760 | A1 | 5/2011 | Bevan et al. |
| 2013/0083684 | A1 | 4/2013 | Yeh et al. |
| 2013/0288737 | A1* | 10/2013 | Nentwig ............ H04W 52/243 455/522 |
| 2016/0021594 | A1* | 1/2016 | Yilmaz ................ H04W 36/30 370/332 |
| 2016/0255669 | A1* | 9/2016 | Fodor .................. H04W 76/14 370/329 |

OTHER PUBLICATIONS

Bresler et al., "The Approximate Capacity of the Many-to-One and One-to-Many Gaussian Interference Channels," IEEE Transactions on Information Theory, vol. 56, No. 9, pp. 4566-4592, Sep. 2010.

Cadambe et al., "Interference Alignment and Degrees of Freedom of the K-User Interference Channel," IEEE Transactions on Information Theory, vol. 54, No. 8, pp. 3425-3441, Aug. 2008.

Chaporkar et al., "Throughput Guarantees Through Maximal Scheduling in Wireless Networks," IEEE Transaction on Information Theory, vol. 54, No. 2, 2008, pp. 572-594.

Doppler et al., Device-to-Device Communication as an Underlay to LTE-Advanced Networks, IEEE Communications Magazine, vol. 47, No. 12, pp. 4249, Dec. 2009.

Duong et al., "Distance-Based Interference Coordination for Device-to-Device Communications in Cellular Networks," in proceedings of Fifth International Conference on Ubiquitous and Future Networks (ICUFN), pp. 776-779, Jul. 2013.

Ericcson white paper, "5G Radio Access—Research and Vision", Jun. 2013.

Etkin et al., "Gaussian Interference Channel Capacity to Within One Bit," IEEE Transactions on Information Theory, vol. 54, No. 12, pp. 5534-5562, Dec. 2008.

Fodor et al., "Design Aspects of Network Assisted Device-to-Device Communications," IEEE Communications Magazine, vol. 50, No. 3, pp. 170-177, Mar. 2012.

Geng et al., "On the Optimality of Treating Interference as Noise", IEEE Transactions on Information Theory, vol. 61, No. 4, 2015, pp. 1753-1767.

Gupta et al., "The Capacity of Wireless Networks," IEEE Transactions on Information Theory, vol. 46, No. 2, 2000, pp. 388-404.

Han et al., "A New Achievable Rate Region for the Interference Channel", IEEE Transactions on Information Theory, vol. 27, No. 1, 1981, pp. 49-60.

Jafarian et al., "Achievable Rates for K-User Gaussian Interference Channels," IEEE Transactions on information Theory, vol. 58, No. 7, pp. 4367-4380, Jul. 2012.

Ji et al., "Wireless Device-to-Device Caching Networks: Basic Principles and System Performance", IEEE Journal on Selected Areas in Communications, vol. 34, No. 1, 2016, pp. 176-189.

Lei et al., "Operator Controlled Device-To-Device Communications in LTE-Advanced Networks," IEEE Wireless Communications, vol. 19, No. 3, pp. 96-104, Jun. 2012.

Lin et al., "A Comprehensive Framework for Device-to-Device Communications in Cellular Networks," e-print arXiv:1305.4219, 14 pages.

Lin et al., "The Impact of Imperfect Scheduling on Cross-Layer Rate Control in Multihop Wireless Networks," in proceedings of 24th Annual Joint Conference of the IEEE Computer and Communications Societies (INFOCOM), 2005.

Maddah-Ali et al., "Communication Over MIMO X Channels: Interference Alignment, Decomposition, and Performance Analysis," IEEE Transactions on Information Theory, vol. 54, No. 8, pp. 3457-3470, Aug. 2008.

Mann et al., "On the Statistical Treatment of Linear Stochastic Difference Equations," Econometrica, vol. 11, No. 3/4, pp. 173-220, 1943.

McDiarmid et al., "On the chromatic number of random geometric graphs," Combinatorica, vol. 31, No. 4, pp. 423-488, Nov. 2011.

Ordentlich et al., "The Approximate Sum Capacity of the Symmetric Gaussian K-User Interference Channel", IEEE Transactions on Information Technology Theory, vol. 60, No. 6, 2014, pp. 3450-3482.

Sharma et al., "Maximum Weighted Matching with Interference Constraints," in proceedings of Fourth Annual IEEE International Conference on Pervasive Computing and Communications Workshops, (PerCom), 2006.

Sharma et al., "On the Complexity of Scheduling in Wireless Networks," in proceedings of The Twelfth Annual ACM International Conference on Mobile Computing and Networking (MobiCom), 2006.

Tassiulas et al., "Jointly Optimal Routing and Scheduling in Packet Radio Networks," IEEE Transactions on Information Theory, vol. 38, No. 1, 1992, pp. 165-168.

Wu et al., "FlashLinQ: A Synchronous Distributed Scheduler for Peer-to-Peer Ad Hoc Networks," IEEE/ACM Transactions on Networking, vol. 21, No. 4, pp. 1215-1228, Aug. 2013.

Zulhasnine et al., "Efficient Resource Allocation for Device-to-Device Communication Underlaying LTE Network," in proceedings of IEEE 6th International Conference on Wireless and Mobile Computing, Networking and Communications (WiMob), pp. 368-375, Oct. 2010.

* cited by examiner

Algorithm 1 Implementation of Distributed ITLinQ

1: initialize $active(1) = 1$, $active(j) = 0$, $\forall j = 2, ..., n$;
2: for $j = 2, ..., n$
3:    $S_j = \{i : i \leq j \text{ and } active(i) = 1\}$
4:    if $INR_{ji} \leq MSNR_j^\eta$ at $D_j$, $\forall i \in S_j$
5:       $flag_{D_j} = 1$;
6:    endif
7:    if $INR_{ij} \leq MSNR_j^\eta$ at $S_j$, $\forall i \in S_j$
8:       $flag_{S_j} = 1$;
9:    endif
10:    $active(j) = flag_{D_j} \cdot flag_{S_j}$;
11: end
12: return $active$

FIG. 13

Algorithm 2 Fair ITLinQ

1: initialize $active(1) = 1$, $active(j) = 0$, $\forall j = 2, ..., n$;
2: for $j = 2, ..., n$
3:    $S_j = \{i : i \leq j \text{ and } active(i) = 1\}$
4:    if $INR_{j,i} \leq MSNR_j^\eta$ at $D_j$, $\forall i \in S_j$
5:      $flag_{D_j} = 1$;
6:    endif
7:    if $SNR_j \leq SNR_{th}$
8:      if $INR_{i,j} \leq MSNR_j^\eta$ at $S_j$, $\forall i \in S_j$
9:        $flag_{S_j} = 1$;
10:     endif
11:   else
12:     if $INR_{i,j} \leq MSNR_j^{\tilde{\eta}}$ at $S_j$, $\forall i \in S_j$
13:       $flag_{S_j} = 1$;
14:     endif
15:   endif
16:   $active(j) = flag_{D_j} \cdot flag_{S_j}$;
17: end
18: return $active$

FIG. 18

SPECTRUM SHARING IN DEVICE-TO-DEVICE COMMUNICATION SYSTEMS

PRIORITY CLAIM

This patent document is a 35 U.S.C. § 371 National Stage application of PCT Application No. PCT/US2014/067192, filed on Nov. 24, 2014, which further claims the benefits and priority of U.S. Provisional Patent Application 61/908,005 entitled "SPECTRUM SHARING IN DEVICE-TO-DEVICE COMMUNICATION SYSTEMS" and filed on Nov. 22, 2013, the entirety of which are incorporated by reference herein.

STATEMENT REGARDING FEDERALLY SPONSORED RESEARCH OR DEVELOPMENT

This invention was made with government support by the National Science Foundation (NSF) under Grant Numbers NETS-1161904 and CCF-0953117. The government has certain rights in this invention.

TECHNICAL FIELD

This patent document generally relates to wireless communication systems. More specifically, the patent document relates to techniques for spectrum sharing in device-to-device (D2D) communication among mobile users.

BACKGROUND

Device-to-device (D2D) communication among mobile users is expected to play a key role in next generation wireless communication systems. The D2D communication functionality can enable various applications and services, such as proximity-based applications involving discovering and communicating with nearby devices (e.g., Internet of Things). Such functionality can also enable higher data rates and system capacity by leveraging the underlying peer-to-peer wireless network that can be created via local communication among the users. Moreover, incorporating caching capability into D2D communication networks have been shown to significantly enhance the system throughput for applications that follow a popularity pattern, such as the on-demand video traffic for which a few dominant videos account for a large part of the traffic.

SUMMARY

Techniques for spectrum sharing by classifying a set of users into multiple subsets of users are disclosed. In some disclosed embodiments, the subset of users are considered non-conflicting to each other when they satisfy a criteria in which at each user in the subset, the desired channel strength is at least the sum of strengths of the strongest interference from that user and the strongest interference to that user. Theoretical optimality of such a condition is also proved in this document.

In one example aspect, a method of managing spectrum sharing in a wireless communication network is disclosed. The method includes identifying a set of users in the wireless communication network which shares a spectrum of communication, classifying the set of users into multiple subsets of users, wherein each subset of users in the multiple subsets of users is determined such that during simultaneous communication among the subset of users and when treating interference inside the subset of users during the simultaneous communication as noise, an information-theoretically-optimal condition is achieved for the simultaneous communication among the subset of users, and scheduling, within a given time slot, one subset of users among the multiple subsets of users to transmit and receive data at the same time so that the scheduled subset of users shares the spectrum of communication.

In another example aspect, a technique for device to device communication in a wireless communication network is disclosed. Using the technique, wireless user devices in the wireless communication network are allowed to perform device to device communication. The wireless user devices are classified into multiple subsets of wireless user devices by selecting wireless user devices in each subset based on signal-to-noise ratio and interference-to-noise ratio during simultaneous communication among the subset of users where the signal to noise ratio level is no less than the sum of the strongest incoming interference-to-noise ratio and the strongest outgoing interference-to-noise ratio. Within a given time slot, one subset of wireless user devices among the multiple subsets of wireless user devices is scheduled to transmit and receive data at the same time so that the scheduled subset of wireless user devices shares a spectrum of communication.

BRIEF DESCRIPTION OF THE DRAWINGS

FIG. 13 shows an example code listing of an implementation of the distributed ITLinQ algorithm.

FIG. 18 shows an example code listing for implementing the fair ITLinQ algorithm.

DETAILED DESCRIPTION

The last few years has seen an explosive growth in the number of wireless devices such as mobile phones, tablets, wireless sensors, utility meters, and so on. Often, the number of wireless devices operating at a given location, e.g., public places such as airports and shopping malls, becomes so large that, without proper coordination, transmissions from these devices may interfere with each other.

It is a complex technical issue to control wireless communication devices so that their transmissions do not degrade overall user experience. The technology disclosed in the present document is related to spectrum sharing in device-to-device communication systems. Using optimality condition for treating interference as noise, we define a new concept of information theoretic independent sets (ITIS), which indicates the sets of users for which simultaneous communication and treating the interference from each other as noise is information-theoretically optimal (to within a constant gap). Based on this concept, we develop a new spectrum sharing mechanism, called information theoretic link scheduling (ITLinQ), which at each time schedules those users that form an ITIS. We first provide a performance guarantee for ITLinQ by characterizing the fraction of the capacity region that it can achieve in a network with sources and destinations located randomly within a fixed area. Furthermore, we demonstrate how ITLinQ can be implemented in a distributed manner, using an initial 2-phase signaling mechanism which provides the required channel state information at all the users. Finally, through numerical analysis, we show that distributed ITLinQ can outperform similar state-of-the-art spectrum sharing mechanisms, such as FlashLinQ, by more than a 100% of sum rate gain, while keeping the complexity at substantially the same level.

I. Overview

Device-to-device (D2D) communication among mobile users is expected to play a key role in next generation wireless communication systems. The D2D communication functionality can enable various applications and services, such as proximity-based applications involving discovering and communicating with nearby devices (e.g., Internet of Things). Such functionality can also enable higher data rates and system capacity by leveraging the underlying peer-to-peer wireless network that can be created via local communication among the users. Moreover, incorporating caching capability into D2D communication networks have been shown to also significantly enhance the system throughput for applications that follow a popularity pattern, such as the on-demand video traffic for which a few dominant videos account for a large part of the traffic.

In view of the increasing density of mobile users in wireless networks, spectrum sharing and interference management inside device-to-device (D2D) communication networks has become highly important issues for the aforementioned applications and improvements.

Figure 1:
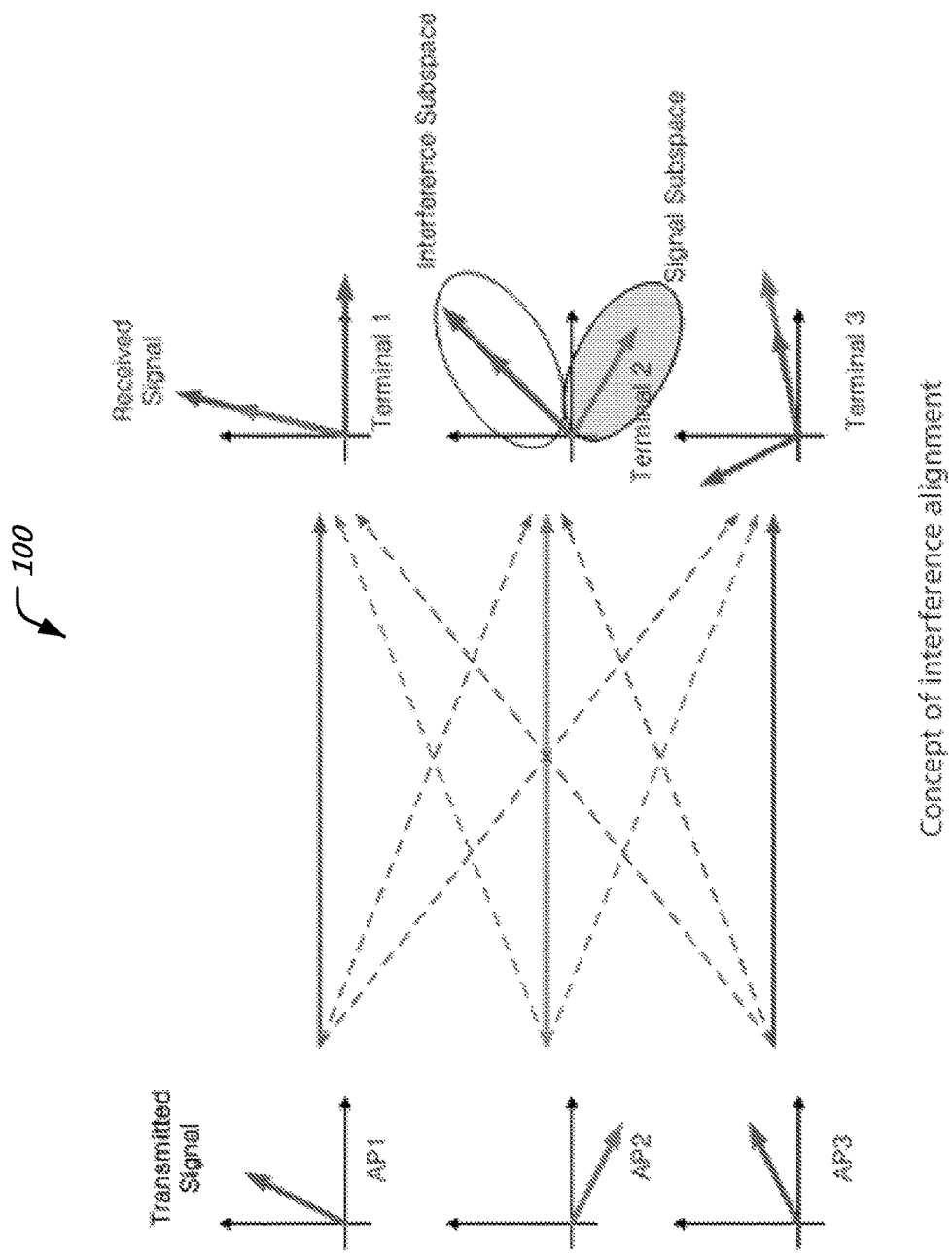
FIG. 1 shows an example of a fully-coordinated wireless communication network.

FIG. 1 shows an example of a fully-coordinated cellular type network 100, which may be implemented in practice through careful planning and coordination.

Figure 2:
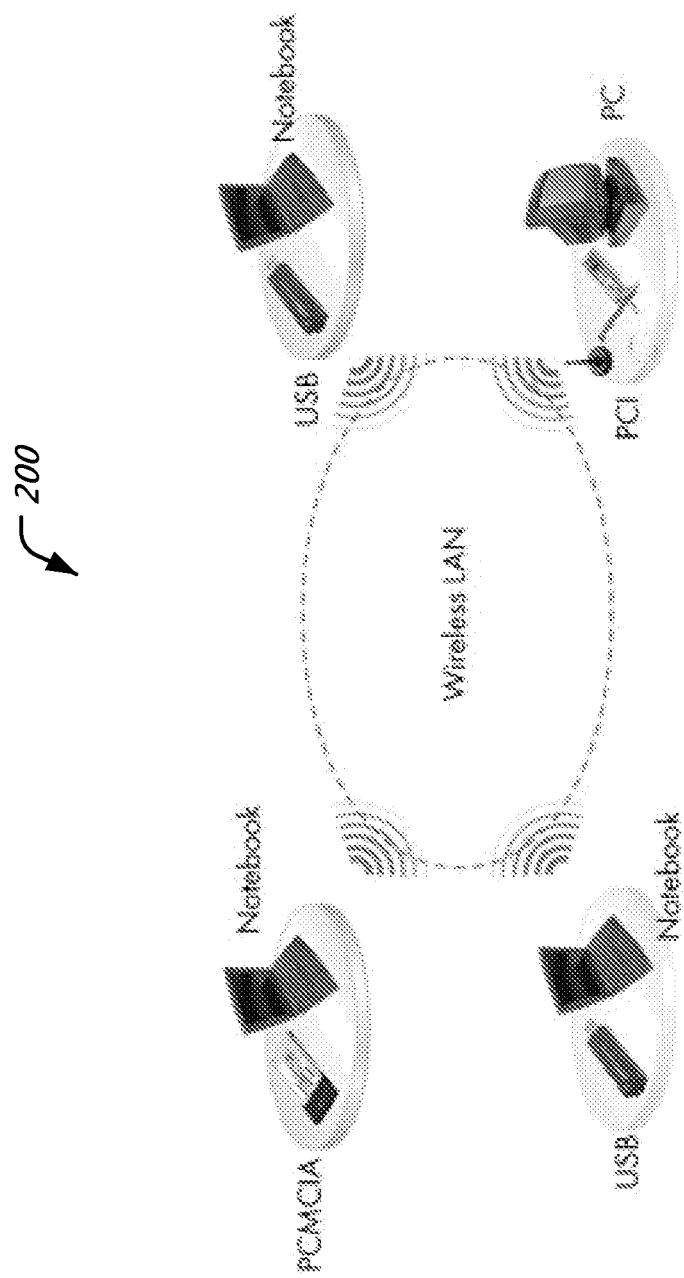
FIG. 2 shows an example of a distributed wireless communication network.

FIG. 2 shows an example of a fully distributed WiFi-type network 200. The media access efficiency typically degrades significantly as the number of users grows.

One challenge for interference management in such networks is that neither fully coordinated synchronous cellular-type approaches that rely on advanced physical layer designs, nor fully distributed and asynchronous WiFi-type mechanisms (such as CSMA/CA) are adequate. The downside of the first type of interference management mechanisms is that they need levels of centralization, coordination, and information at the mobile nodes that are difficult to accomplish in practice. On the other hand, the problem with the second type of approaches is that their performance degrades significantly as the number of users grows.

In a recent approach that is based on a minimal level of coordination among the users which also maintains its promising performance for large numbers of users, called FlashLinQ, a distributed scheduling scheme which demonstrates considerable improvement over pure CSMA/CA has been described. In a system of multiple source-destination pairs (links), this scheduling technique first orders the links according to a randomly selected priority list. Then, starting from the higher-order links, each link is scheduled if it does not cause and does not receive "much" interference from the already scheduled links. The level of acceptable interference is determined based on the observed signal-to-interference ratio (SIR) at all the previously scheduled links and also the current link.

FlashLinQ scheduling can also be viewed as a refinement of the conventional independent set scheduling which is based on using a conflict graph to model the interference among the users. In the independent set scheduling approach, two users (source-destination pairs) are considered to be mutually non-interfering, hence able to transmit data at the same time, if the interference that they cause on each other's destinations is below a certain threshold. The drawback of this scheme is that this threshold is set at a fixed value (often at noise level) which does not capture the effect of the number of users, their density inside the cell area, etc. Furthermore, the scheme does not consider the signal-to-noise ratio (SNR) level that each user itself can achieve and only takes the interference levels into account. FlashLinQ, however, overcomes this problem by comparing the direct signal power level that each user gets with its incoming interference power level. Also, in the FlashLinQ scheduling technique, if a user does not cause/receive much interference to/from higher-priority users, but does not get a high direct signal power itself, it gets silent and "yields" such that lower-priority users have the opportunity to contribute more to the overall sum-throughput of the network.

Nevertheless, both FlashLinQ and independent set scheduling approaches aim at finding subsets of users in which the interference among them is at a "sufficiently" low level, so that their simultaneous transmissions are not detrimental to each other. These techniques leave un-addressed the issue of what would be a theoretically-justified way of creating such subsets, and determining whether the interference among them is at a "sufficiently" low level?

Figure 3:
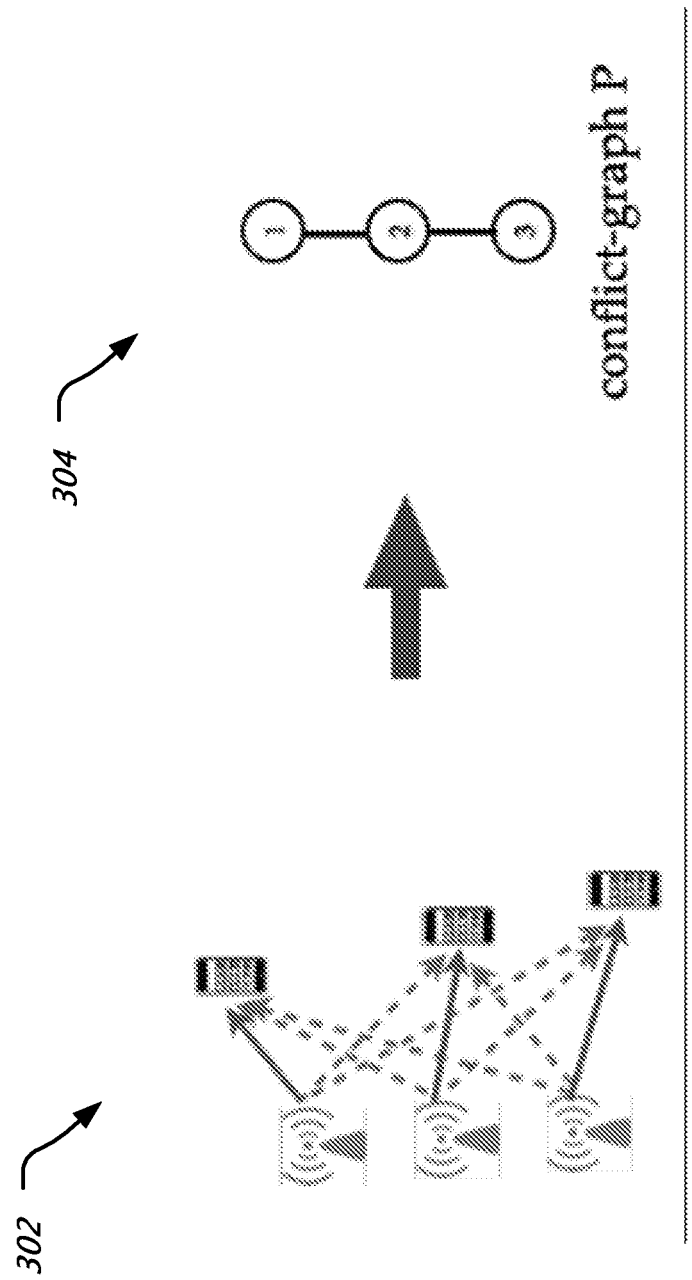
FIG. 3 shows an example of a conflict graph that can be constructed for a communication network.

Example depiction of FIG. 3 illustrates the approach to rely on a small level of coordination for scheduling links 302 in which "conflict graph" (304) is used to describe when interference among a set of users is "low enough." Using this approach, e.g., FlashLinQ, a set of non-conflicting users are scheduled at each time and the interference among them is treated as noise. Two key challenges faced by implementations as depicted in FIG. 3 are (1) How to define the conflict graph? (2) How to design a scheduler with minimal coordination?

Figure 4:
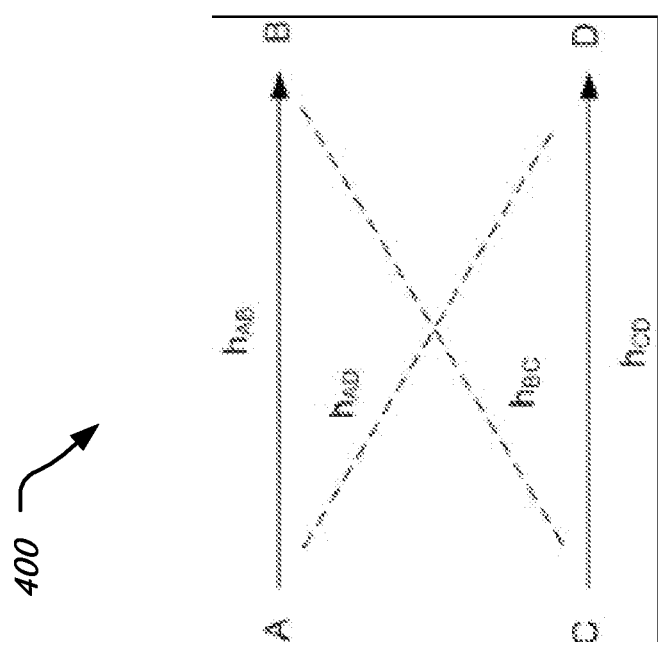
FIG. 4 shows an example communication network with two receivers and two transmitters.

FIG. 4 illustrates the above-discussed examples of how to define a conflict graph, e.g., for a network represented by graph 400. A first approach, sometimes called a Geometric approach includes comparing Interference-to-noise ratio (INR) to a fixed threshold. If INR between two users is below threshold, they are considered non-conflicting (i.e., independent). In a path-loss fading, this corresponds to a "fixed distance-guard." The criteria used in such as case may be: $INR \leq \gamma_{IS}$.

The above-discussed FlashLinQ technique compares the Signal-to-interference ratio (SIR) to a fixed threshold. If SIR between two users is above threshold, they are considered non-conflicting (i.e., independent). The criteria used may be written as: $SIR \geq \gamma$. In a path-loss fading scenario, this corresponds to an "adaptive distance guard."

In this patent document, a new technique that incorporates "information-theoretic independent sets (ITIS)," is disclosed. In one aspect, ITIS indicates the set of users for which simultaneous communication and treating the interference as noise is information-theoretically optimal, to within a constant gap. More specifically, in a wireless network, a subset of users forms an ITIS, when configured by a scheme of using point to point Gaussian codebooks with appropriate power levels at each transmitter and treating interference as noise at every receiver, the configuration can achieve the entire information-theoretic capacity region of that subset of users to within a constant gap. An optimality condition for treating interference as noise can be used to provide a description of ITIS based on the channel gains among the users in the network.

Referring back to FIG. 3 and FIG. 4, the two criteria used were, for Geometric metric $INR \leq \gamma$ and for FlashLinQ Metric $SIR \geq \gamma$. Using similar notation, in some disclosed implementations, the following criteria is used instead to identify subsets of all users which are allowed to communicate at the same time:

$$\frac{\sqrt{SNR}}{INR} \geq \gamma$$

As described in greater detail in this document, a subset of users can be defined to create an ITIS if, for any user in the subset, the SNR (Signal to Noise Ratio) level is no less than the sum of its strongest incoming interference-to-noise ratio (INR) and its strongest outgoing INR (all measured in dB scale). This condition is different from that of FlashLinQ and independent set scheduling which only rely on thresholds on SIR and INR values to identify the subsets of users with "sufficiently" low levels of interference.

Furthermore, this document discloses a new spectrum sharing mechanism, referred to as "information-theoretic link scheduling" (in short, ITLinQ). In some embodiments, ITLinQ schedules the users in an information-theoretic independent set to transmit data at the same time. It may be possible to characterize the guaranteed fraction of the capacity region that ITLinQ is able to achieve in a specific network setting. In particular, an implementation may include a set of n source-destination pairs, where the source nodes are spread randomly and uniformly over a circular cell of fixed radius and each destination node is located within a distance $r_n \propto n^{-\beta}$ of its corresponding source node. Channel gains may be estimated using a path-loss model. In such a configuration, the criteria for defining information-theoretic independent sets transforms the network into a random geometric graph which enables us to characterize the fraction of capacity region that can be achieved by the disclosed ITLinQ scheme. Depending on the value of $\beta$, three regimes in each of which ITLinQ can achieve a fraction $\lambda$ of the capacity region within a gap of k almost-surely can be considered:

For $0 < \beta < 1$, $\lambda = \Theta(n^{\beta-1})$ and $k = O\left(\frac{\log 3n}{n^{1-\beta}}\right)$.

For $\beta = 1$, $\lambda = \frac{\ln(\ln n)}{\ln n}$ and $k = O\left(\log(\ln n) + \frac{\ln(\ln n)}{\ln n}\right)$.

For $\beta > 1$, $\lambda = \Theta(1)$ and $k = O(\log 3n)$.

This shows a considerable improvement over the fraction of the capacity region that the conventional independent set scheduling can achieve, which is $$\frac{1}{n}$$

(derived via numerical analysis).

The present document also addresses and solves the challenge of distributed implementation of the ITLinQ scheme. In some embodiments, a distributed spectrum sharing scheme based on ITLinQ, whose complexity is comparable to the FlashLinQ technique, can be implemented. The conditions that should be satisfied for the sources and destinations in this scheme are based on the sufficient conditions for the optimality of treating interference as noise, hence providing a strong theoretical backbone for the algorithm. The present document also provides results of numerical evaluation of the performance of some embodiments of the disclosed distributed scheme and compares it with FlashLinQ in an outdoor setting with 8-4096 links of random lengths spread uniformly at random in a square cell. In the simulated embodiments, the sum-rate achieved by the distributed ITLinQ scheme improves over that of FlashLinQ by more than 100%, while keeping the complexity at substantially the same level.

Section headings are used in the present document for clarity only, and do not limit the scope of the disclosed subject matter.

II. Description and Analysis of the Information-Theoretic Link Scheduling Scheme Some of the disclosed techniques could be explained using the concept of an "information-theoretic independent set" (in short, "ITIS"). Some useful aspects of the disclosed technology are highlighted using a specific network setting and in that setting, characterizing the fraction of capacity region that ITLinQ is able to achieve to within a gap, for understanding of the disclosed technology.

A. Example Embodiments of ITIS and ITLinQ

As an example network in which some of the disclosed technology can be implemented, consider a wireless network composed of n sources $\{S_i\}_{i=1}^n$ and n destinations $\{D_i\}_{i=1}^n$ in which each source aims to communicate a message to its corresponding destination. All the links (i.e., source destination pairs) can be considered to share the same spectrum, which gives rise to interference among all the transmissions. For simplification, it may be assumed that all the nodes (i.e., all the sources and the destinations) know how many links exist in the network and they also agree on a specific ordering of the links. In this context, "ordering" may mean a labeling of the links from 1 to n. Furthermore, the nodes could be synchronous; i.e., there exists a common clock among them.

The physical-layer model of the network is considered to be the AWGN model in which each source $S_i$ intends to send a message $W_i$ to its corresponding destination $D_i$, and does so by encoding its message to a codeword $X_i^k$ of length k and transmitting it within k time slots. There is a power constraint of $$\mathbb{E}\left[\frac{1}{k}\|X_i^k\|^2\right] \leq P$$

on the transmit vectors. The received signal vector of destination j will be equal to $$Y_j^k = \sum_{i=1}^n h_{ji} X_i^k + Z_j^k,$$

where $h_{ji}$ denotes the channel gain between source i and destination j, and $Z_j^k$ denotes the additive white Gaussian noise vector at destination j with distribution $CN(0, NI_k)$, $I_k$ being the k×k identity matrix.

Figure 5:
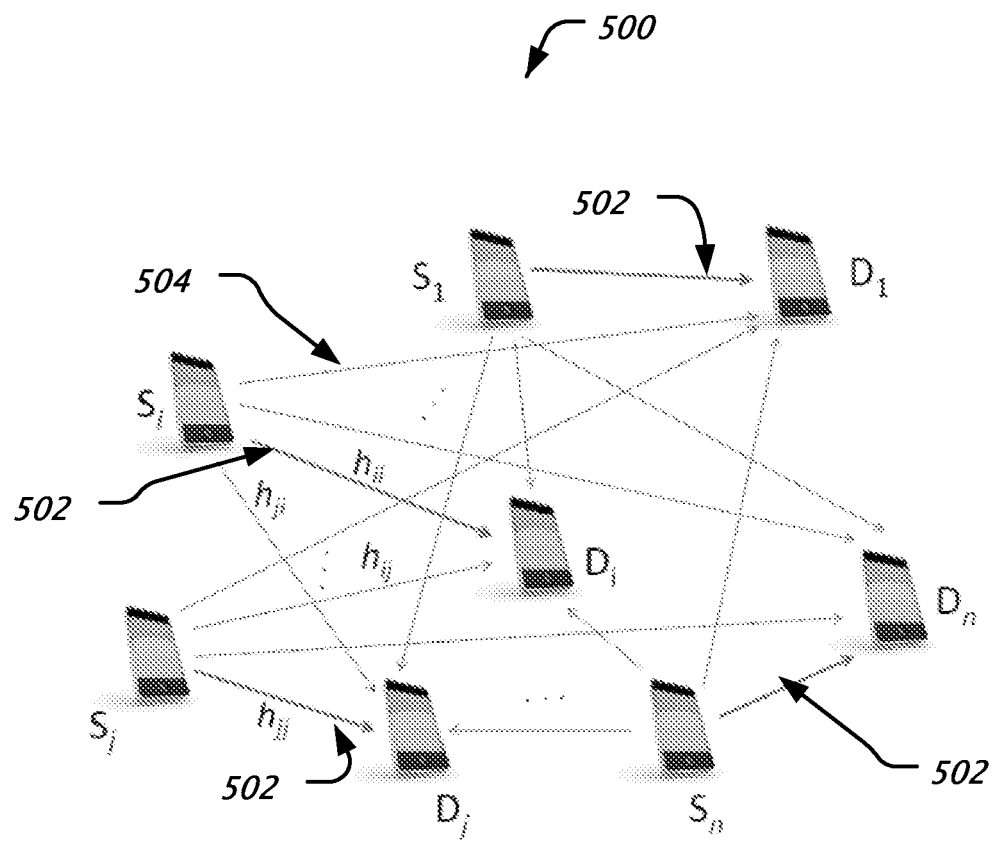
FIG. 5 shows an example of a wireless network composed of n source-destination pairs, including the direct and cross channel gains.

An example of such a network configuration is illustrated in FIG. 5, which shows an example of a wireless network 500 composed of n source-destination pairs, where the lines 502 (only some of which have reference numbers) and 504 represent direct and cross channel gains, respectively.

At each destination, all the incoming interference may be treated as noise, e.g., a statistically unknown signal. Therefore, each source-destination pair $S_i$-$D_i$ can achieve the rate of $Ri=\log(1+SINR_i)$, where $$SINR_i \triangleq \frac{P|h_{ii}|^2}{\sum_{j \neq i} P|h_{ij}|^2 + N}$$

denotes the signal-to-interference-plus-noise ratio at destination i.

While these signals are treated as noise for simplicity, other physical-layer coding schemes such as message splitting and successive interference cancellation, interference alignment, and structured coding could be used.

However, it can be shown that under a general condition in a network comprising multiple source-destination pairs, treating interference as noise is information-theoretically optimal (to within a constant gap). The result is provided in Theorem 1.

Theorem 1.

In a wireless network of n source-destination pairs, if the following condition is satisfied, then treating interference as noise (in short, TIN) can achieve the whole capacity region to within a constant gap of $\log_2(3K)$:

$$SNR_i \geq \max_{j \neq i} INR_{ij} \cdot \max_{k \neq i} INR_{ki}, \forall i = 1, \ldots, n, \quad (1)$$

where $$SNR_i \triangleq \frac{P|h_{ii}|^2}{N} \text{ and } INR_{ij} \triangleq \frac{P|h_{ij}|^2}{N}$$

denote the signal-to-noise ratio of user i and the interference-to-noise ratio of source j at destination i, respectively.

Therefore, considering any subset of the source-destination pairs in a wireless network and showing that condition (1) is satisfied in that subset, can thus prove that TIN is information-theoretically optimal in that subset of the users (to within a constant gap). This means that the interference is at a sufficiently low level in this subnetwork that makes it suitable to call such a subset an "information-theoretic independent subset". More formally, the following definition 1 can be used.

Figure 6:
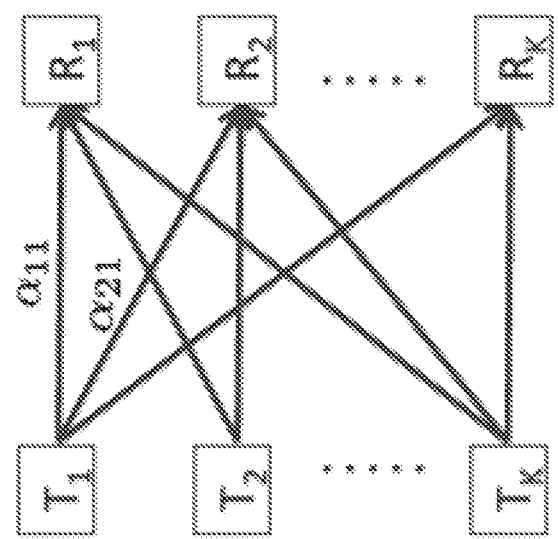
FIG. 6 shows an example arrangement of K transmitters and K receivers.

FIG. 6 pictorially represents an arrangement of K transmitters and K receivers.

Figure 7:
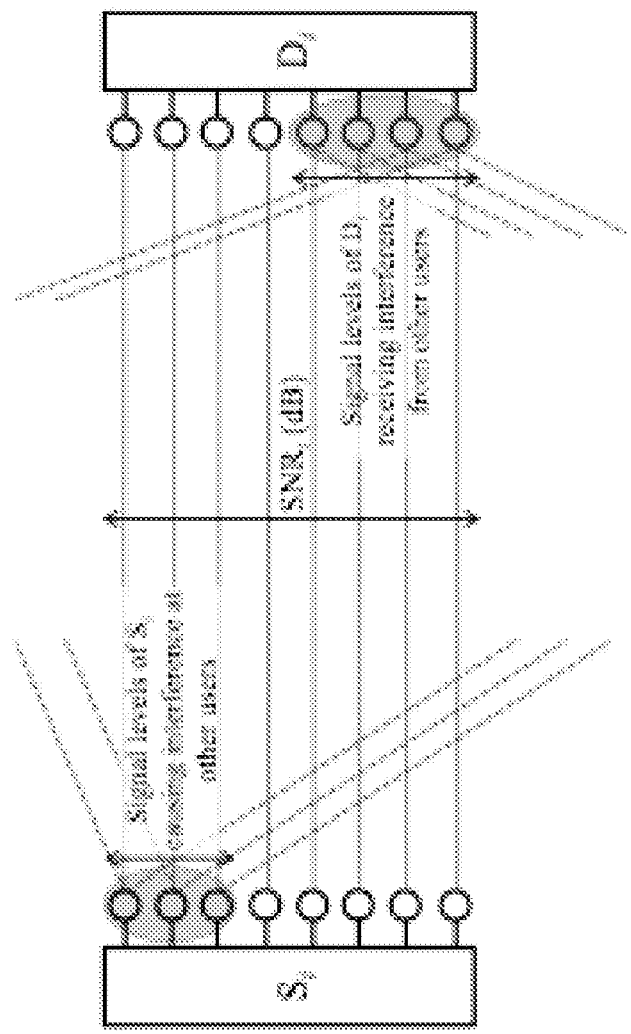
FIG. 7 shows an example grouping of signal levels between a transmitter and its corresponding receiver into non-overlapping subsets of levels.

FIG. 7 shows the representation of the condition in Theorem 1 in terms of non-overlapping subsets of signal levels for each user which cause and receive interference at/from other users.

Definition 1 (ITIS).

In a wireless network of n users, a subset of the users $S \subseteq \{1, \ldots, n\}$ is called an information-theoretic independent set (in short, ITIS) if for any user $i \in S$, $$SNR_i \geq \max_{j \in S \setminus \{i\}} INR_{ij} \cdot \max_{k \in S \setminus \{i\}} INR_{ki}. \quad (2)$$

Figure 8:
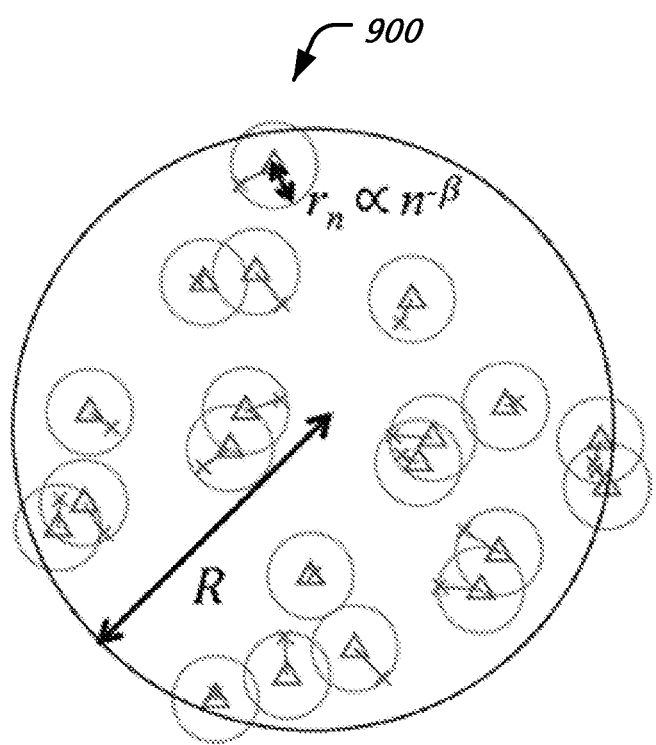
FIG. 8 shows an example network with radius R in which multiple sources are transmitting and each receiver is located within distance $r_n$ of its corresponding transmitter.

The difference between such a concept and the regular notion of an independent set lies in the fact that in the latter case, the interference between any pair of users should be below a certain threshold (e.g., noise level), whereas in the former case, the interference between all of the users is at such a low level (determined by condition (1)) that makes it (to within a constant gap) information-theoretically optimal to treat all the interference as noise. FIG. 8 represents an example of an ITIS 802 in a communication network 800. Based on the concept of ITIS, a scheduling scheme as follows can be used.

Definition 2 (ITLinQ).

The information-theoretic link scheduling (in short, ITLinQ) scheme, in one aspect, is a spectrum sharing mechanism which, at each time, schedules the sources in an information-theoretic independent set (ITIS) to transmit simultaneously. Moreover, all the destinations may treat their incoming interference as noise.

Remark.

In order to gain more understanding about the information theoretic independent sets, consider a simple sufficient condition for the scheduling condition in (2). It is easy to verify that a subset of users S form an ITIS if for any user $i \in S$, $$INR_{ij} \leq \sqrt{SNR_i}, INR_{ji} \leq \sqrt{SNR_i}, \forall j \in S \setminus \{i\}.$$

This condition compares the ratio between the INR and SNR values in dB scale with a fixed threshold of ½. This aspect of this condition is different compared to the conditions used in FlashLinQ, in which the difference between the INR and SNR values in dB scale is compared with a fixed threshold. For simplicity, the theoretical framework of the present document assumes this sufficient condition 1 for both the capacity analysis and the distributed implementation of the ITLinQ scheme.

B. Capacity Analysis of the ITLinQ Scheme

Figure 9:
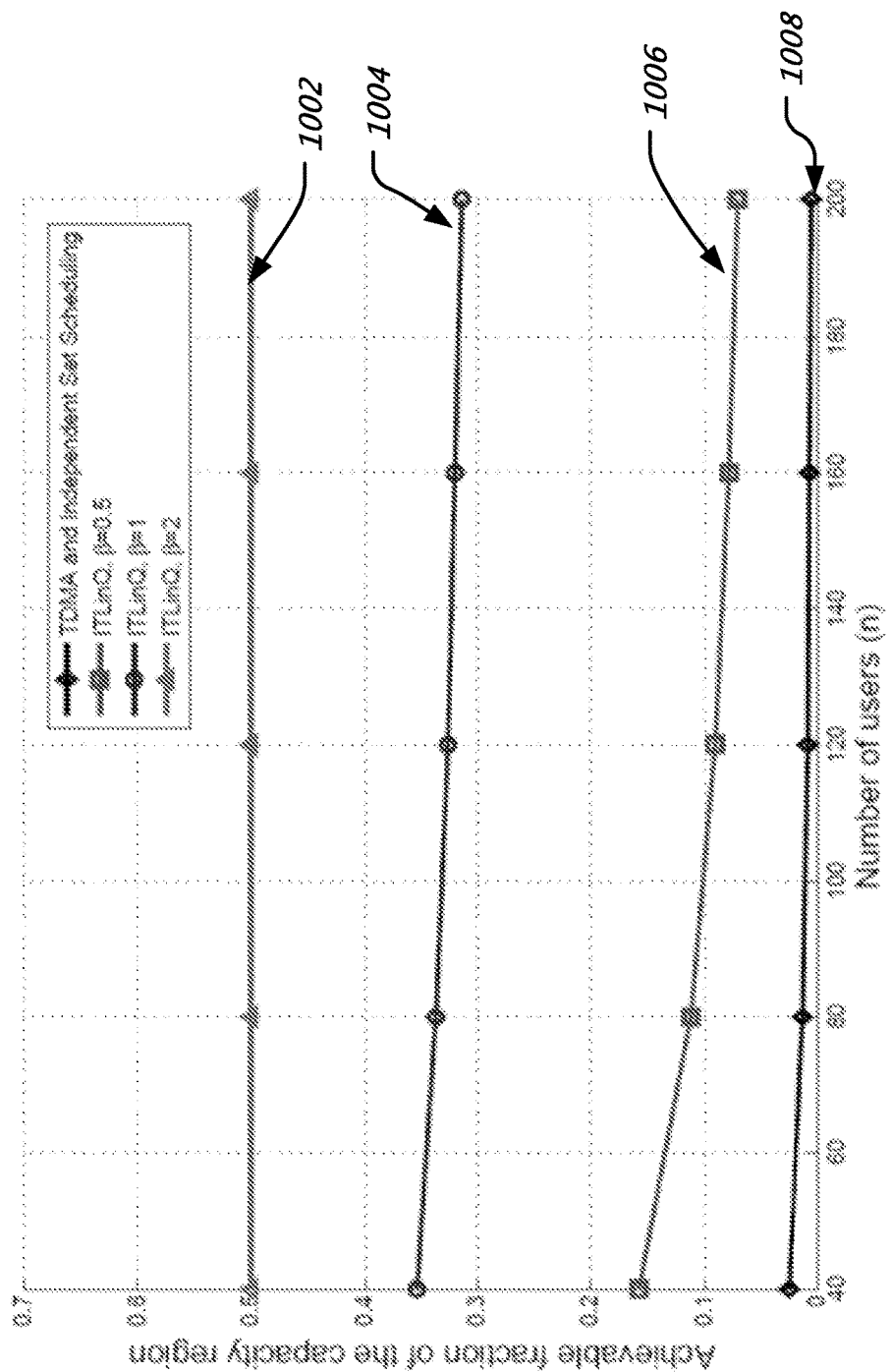
FIG. 9 shows an example comparison of the guaranteed achievable fraction of capacity region by the ITLinQ scheme in different regimes with TDMA and independent set scheduling.

In some implementations, it is beneficial to know the fraction of the capacity region that the ITLinQ scheme can achieve to within a gap in a network with a large number of users. As depicted in the example network 900 of FIG. 9 in which the sources are placed uniformly and independently inside a circle of radius R, and each destination Di is assumed to be located within a distance $r_n = r_0 n^{-\beta}$, $\beta > 0$, of its corresponding source Si may be used in some embodiments. This implies that the destination nodes get closer and closer to their corresponding source nodes as the number of users increases. Moreover, each channel gain may be a deterministic function of the distance between its corresponding source and destination. In such cases, the path-loss model for the channel gains may be considered in which the squared magnitude of the channel gain at a distance r is equal to $h_0 r^{-\alpha}$, where $h_0$ is a fixed real number and $\alpha$ denotes the path-loss exponent.

For above-discussed deployments, the following theorem characterizes a guarantee on the fraction of the capacity region that can be achieved by the ITLinQ scheme.

Theorem 2.

For sufficiently large number of users ($n \to \infty$) in the above model, the ITLinQ scheme can almost-surely achieve a fraction $\lambda$ of the capacity region within a gap of k bits, where $$\begin{cases} \lambda = \frac{2\pi R^2}{\sqrt{3}\,\gamma^2} n^{\beta-1}, k \le \frac{2\pi R^2}{\sqrt{3}\,\gamma^2} \frac{\log 3n}{n^{1-\beta}} & \text{if } 0 < \beta < 1 \\ \lambda = \frac{\ln(\ln n)}{\ln n}, k \le \log(\ln n) + \frac{(\log 3)\ln(\ln n)}{\ln n} & \text{if } \beta = 1 \\ \lambda = \frac{1}{\left\lfloor \frac{1}{\beta-1} + \frac{1}{2} \right\rfloor + 1}, k \le \frac{\log 3n}{\left\lfloor \frac{1}{\beta-1} + \frac{1}{2} \right\rfloor + 1} & \text{if } \beta > 1 \end{cases}$$

in which $$\gamma = \sqrt[2\alpha]{\frac{P}{N} h_0 r_0^\alpha}$$

is a constant independent of n.

Figure 10:
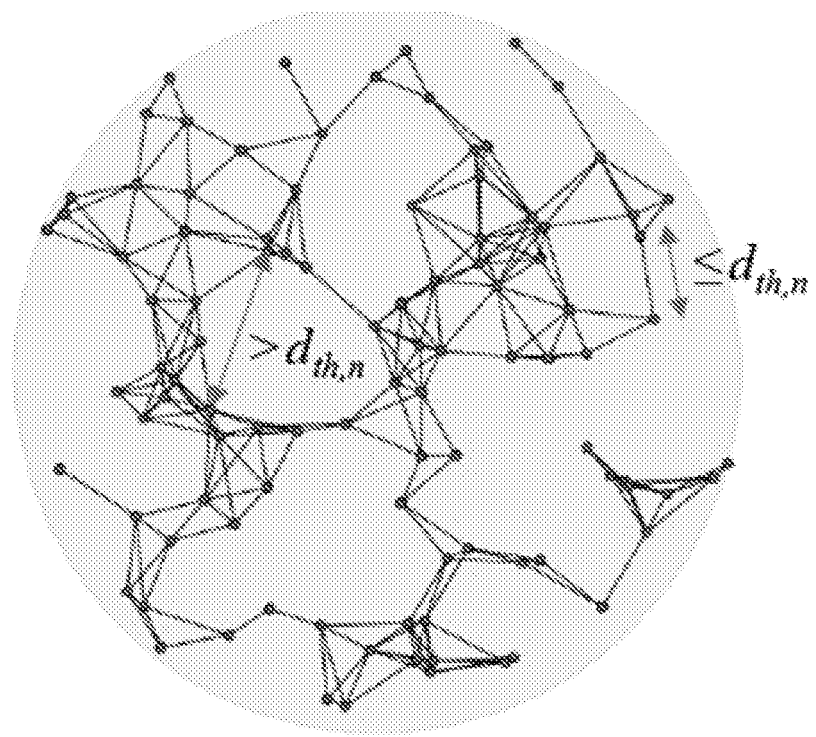
FIG. 10 shows an example representation of a network of multiple sources of transmission as a random geometric graph.

FIG. 10 illustrates the impact of the maximum source-destination distance decreasing rate on the fraction of the capacity region that can be achieved by the ITLinQ scheme. FIG. 10 depicts a comparison of the guaranteed achievable fraction of capacity region by the ITLinQ scheme in different regimes with TDMA and independent set scheduling. The curve 1002 represents results for ITLinQ algorithm, with $\beta = 2$. The curve 1004 represents results for ITLinQ algorithm with $\beta = 1$. The curve 1006 represents results for ITLinQ algorithm with $\beta = 0.5$. The curve 1008 depicts results for a TDMA and independent set scheduling implementation, which is seen to have the least achievable fraction of the capacity region.

If the maximum source-destination distance is proportional to $n^{-\beta}$ such that $0 < \beta < 1$, then the ITLinQ scheme is capable of asymptotically achieving a fraction proportional to $$\frac{1}{n^{1-\beta}}$$

of the capacity region, within a vanishing gap. However, if the maximum source-destination distance scales as $n^{-1}$, then the achievable fraction of the capacity region decreases as $$\frac{\ln(\ln n)}{\ln n}$$

which declines much slower than the previous case. In this case, the gap increases very slowly with respect to n. Finally, in the case that the maximum distance between each source and its corresponding destination scales faster than $n^{-1}$, we can achieve at least a constant fraction of the capacity region for asymptotically large number of users which is a considerable improvement, whereas the gap is increasing with the number of users. This matches the natural intuition that the closer the destinations are located to their corresponding sources, the more the signal-to-interference-plus-noise ratio and the higher the fraction of the capacity that can be achieved by the ITLinQ scheme. Also, as a baseline, we have included the fraction of the capacity region that TDMA and independent set scheduling can achieve, which is 1/n for both schemes. The achievable fraction of the capacity region by independent set scheduling can be derived through numerical analysis.

As an immediate application of the theorem, we can consider the model in which all the n source and the n destination nodes are located uniformly and independently within a circular area of radius R, and each destination gets associated with its closest source. The sources and destinations are then indexed as $\{S_i\}_{i=1}^n$ and $\{D_i\}_{i=1}^n$, respectively. We will refer to this model as the closest access point (closest-AP) selection model.

Corollary 1.

For the closest-AP selection model, the ITLinQ scheme can almost surely achieve a fraction $$\lambda = \frac{\sqrt{3}\,\pi R^2}{2\gamma^2} n^{\beta-1}$$

of the capacity region to within a gap of $$k \le \frac{\sqrt{3}\,\pi R^2}{2\gamma^2} \frac{\log 3n}{n^{1-\beta}}$$

for any $\beta < \frac{1}{2}$ when $n \to \infty$.

1) Proof of Theorem 2: In order to characterize the fraction of the capacity region that ITLinQ is able to achieve and prove Theorem 2, we seek to find the minimum number of information-theoretic independent sets which cover all the users and we will then do time-sharing among these subsets. More precisely, if we denote the set of all the information-theoretic independent subsets of a network composed of n source-destination pairs by $S_n$, then we are interested in the minimum-cardinality subset of $S_n$ whose members cover all the users; i.e., their union is equal to the set of all the users $\{1, \ldots, n\}$. Denote such a subset by $S^*_n$ and let $\kappa_n = |S^*_n|$. We will show that time-sharing among these $k_n$ information-theoretic independent sets can achieve the fractions of the capacity region mentioned in Theorem 2. As the first step of the proof, we characterize the achievable fraction of the capacity region by the ITLinQ scheme and its gap with respect to the random variable $k_n$ in the following lemma.

Lemma 1.

The ITLinQ scheme can achieve a fraction $$\frac{1}{\kappa_n}$$

of a network composed of n source-destination pairs to within a gap of log $$\frac{\log 3n}{\kappa_n}.$$

Proof: Consider any rate tuple $(R_1, \ldots, R_n)$ inside the capacity region of the network and consider any ITIS $\mathcal{U} \in S^*_n$. Since TIN is information-theoretically optimal in U (to within a constant gap), the rate tuple $(\overline{R}_{1,\mathcal{U}}, \ldots, \overline{R}_{n,\mathcal{U}})$ is achievable in the $$\frac{1}{\kappa_n}$$

fraction of time which is allocated to U, where $$\overline{R}_{i,\mathcal{U}} = \begin{cases} R_i - \log 3|\mathcal{U}| & i \in \mathcal{U} \\ 0 & i \notin \mathcal{U} \end{cases}.$$

Therefore, the rate achieved by any user $i \in \{1, \ldots, n\}$ in the network through the ITLinQ scheme, denoted by $R_{i,ITLinQ}$, can be lower bounded as $$R_{i,ITLinQ} = \frac{1}{\kappa_n} \sum_{\mathcal{U} \in S^*_n} \overline{R}_{i,\mathcal{U}} \qquad (3)$$

$$= \frac{1}{\kappa_n} \sum_{\mathcal{U} \in S^*_n, i \in \mathcal{U}} (R_i - \log 3|\mathcal{U}|)$$

$$\geq \frac{1}{\kappa_n}(R_i - \log 3n)$$

$$= \frac{1}{\kappa_n} R_i - \frac{\log 3n}{\kappa_n},$$

where (3) follows from the fact that the subsets in $S^*_n$ cover all the users $\{1, \ldots, n\}$ and that for every $\mathcal{U} \in S^*_n$, we have $|\mathcal{U}| \leq n$. This completes the proof.

An upper bound on $k_n$, that is the minimum number of information-theoretic independent subsets which cover all of the users, is used to find an achievable fraction of the capacity region by the ITLinQ scheme. One way to find such an upper bound is to restrict the TIN-optimality condition in (1). In other words, this could be done by finding another condition that implies condition (1), but is more restricted and more tractable than (1). Imposing such a restricted sufficient condition may reduce the number of information-theoretic independent subsets, hence leading to an upper bound on $k_n$. To this end, Lemma 2 provides relevant results. In the following, the distance between source i and destination j is denoted by $d_{S_iD_j}$ and the distance between sources i and j is denoted by $d_{S_iS_j}$, $\forall i,j$.

Lemma 2.

If in a network of n source-destination pairs within the framework of the model in Section II-B, the distance between $S_i$ and $S_j$ satisfies $d_{S_iS_j} > \gamma n^{-\beta/2} + r_0 n^{-\beta}$ then $\max((INR_{ji})^2, (INR_{ij})^2) < \min(SNR_i, SNR_j)$.

Proof: Based on the model considered in Section II-B, it can be seen that $d_{S_iD_i} \leq r_0 n^{-\beta}$ and $d_{S_jD_j} \leq r_0 n^{-\beta}$. Moreover, from the triangle inequality, it can be deduced that $d_{S_jD_i} \geq d_{S_iS_j} - d_{S_iD_i} > \gamma n^{-\beta/2}$. Similarly, $d_{S_iD_j} > \gamma n^{-\beta/2}$. Therefore, the following inequalities are true:

$$SNR_i = \frac{P}{N} h_0 d_{S_iD_i}^{-\alpha} \geq \frac{P}{N} h_0 (r_0 n^{-\beta})^{-\alpha} = \frac{P}{N} h_0 r_0^{-\alpha} n^{\alpha\beta}, \qquad (4)$$

and $$INR_{ji} = \frac{P}{N} h_0 d_{S_jD_i}^{-\alpha} < \frac{P}{N} h_0 (\gamma n^{-\beta/2})^{-\alpha} = \frac{P}{N} h_0 \gamma^{-\alpha} n^{\alpha\beta/2}. \qquad (5)$$

Combining (4) and (5), it can be seen that $$(INR_{ji})^2 < \left(\frac{P}{N} h_0\right)^2 \gamma^{-2\alpha} n^{\alpha\beta} = \frac{P}{N} h_0 r_0^{-\alpha} n^{\alpha\beta} \leq SNR_i, \qquad (6)$$

and likewise, it can be seen that:

$$(INR_{ij})^2 < SNR_i. \qquad (7)$$

Combining (6) with (7) yields $\max((INR_{ji})^2, (INR_{ij})^2) < SNR_i$. By symmetry, $\max((INR_{ji})^2, (INR_{ij})^2) < SNR_j$. This completes the proof.

Consequently, Lemma 2 implies that there exists a threshold distance of $d_{th,n} = \gamma n^{-\beta/2} + r_0 n^{-\beta}$ such that if the distance between two sources is greater than this threshold, the corresponding pair of users are considered to be information-theoretically independent; i.e., the interference they cause on each other is at a sufficiently low level that it is information-theoretically optimal to treat it as noise (to within a constant gap).

Therefore, given a network of n source-destination pairs with nodes spread as mentioned in the model in the beginning of Section II-B, a corresponding undirected graph can be built as $G_n = (V_n, E_n)$ where $V_n = \{1, \ldots, n\}$ is the set of vertices and $(i,j) \in E_n$ if and only if $d_{S_iS_j} \leq d_{th,n}$; i.e., two nodes are connected together if and only if the distance between their sources is no larger than the threshold distance $d_{th,n}$. The resultant graph $G_n$ could be referred to as the information-theoretic conflict graph of the original network. It is clear that this graph is a random geometric graph. FIG. 10 shows an example of such a random geometric graph.

Referring back to the preceding discussion, note that we needed to find an upper bound on $k_n$. The following lemma provides such an upper bound.

Lemma 3.

$\kappa_n \leq \chi(G_n)$ where $\chi(.)$ denotes the chromatic number.

Proof: The chromatic number of $G_n$ is the smallest number of colors that can be assigned to all of the nodes of $G_n$ such that no two adjacent nodes have the same color. Therefore, considering the subsets of the users which receive the same color, $x(G_n)$ is the minimum number of subsets of the users which cover all the users and each of which is comprised of users whose sources have distance larger than $d_{th,n}$. From Lemma 2, it can be shown that if for three distinct users i, j, k, all the pairwise source distances are larger than $d_{th,n}$, then we will have that all the squared INR's within the subnetwork comprised of users $\{i; j; k\}$ are less than all the SNR's. Extending this argument, it can be shown that all the independent subsets of $G_n$ automatically satisfy the TIN-optimality condition of (1), and hence are also information-theoretic independent subsets. Therefore, $k_n$, which denotes the minimum number of information-theoretic independent subsets that cover all the users, can be no more than $x(G_n)$, the chromatic number of $G_n$.

The final step is to characterize the asymptotic distribution of $x(G_n)$. This is done in the following lemma.

Lemma 4.

For the information-theoretic conflict graph $G_n$, $x(G_n)$ exhibits the following behavior as $n \to \infty$.

If $0 < \beta < 1$, then $\frac{\chi(G_n)}{n^{1-\beta}} \xrightarrow{a.s.} \frac{\sqrt{3}}{2\pi R^2} \gamma^2$.

If $\beta = 1$, then $\frac{\chi(G_n)}{\ln n / \ln(\ln n)} \xrightarrow{a.s.} 1$.

If $\beta > 1$, then $\mathbb{P}\left(\chi(G_n) \to \left\lfloor \frac{1}{\beta-1} \right\rfloor + \frac{1}{2} \text{ or } \chi(G_n) \to \left\lfloor \frac{1}{\beta-1} \right\rfloor + \frac{1}{2} + 1\right) = 1$.

Proof: Since the information-theoretic conflict graph $G_n$ is a random geometric graph with threshold distance $d_{th,n} = \gamma n^{-\beta/2} + r_0 n^{-\beta}$ and the nodes are distributed in $\mathbb{R}^2$, the following cases are possible:

If $0 < \beta < 1$, then $nd_{th,n}^2 = \gamma_2 n^{1-\beta} + r_0^2 n^{1-2\beta} \gg \ln n$ (where $f(n) \ll g(n)$ is equivalent to $\lim_{n \to \infty} \frac{f(n)}{g(n)} = 0$).

The dominant term in $\alpha^2 n^{1-\beta} + r_0^2 n^{1-2\beta}$ is the first term, since $\beta > 0$. Also, for the Euclidean norm in $\mathbb{R}^2$, the following holds:

$$\delta = \frac{\pi}{2\sqrt{3}}$$

and $vol(B) = \pi$. Therefore, since the distribution of the nodes is uniform on a circle of radius R, it can be shown that $$\frac{\chi(G_n)}{n^{1-\beta}} \xrightarrow{a.s.} \frac{\sqrt{3}}{2\pi R^2} \gamma^2.$$

If $\beta = 1$, then $nd_{th,n}^2 = \gamma^2 + r_0^2 n^{1-2\beta}$ which converges to a constant asymptotically, since $1 - 2\beta < 0$. Since $n^{-\epsilon} \ll \gamma^2 + r_0^2 n^{1-2\beta}$ for all $\epsilon > 0$, it can be shown that $$\frac{\chi(G_n)}{\ln n / \ln(\ln n)} \xrightarrow{a.s.} 1.$$

If $\beta > 1$, then $nd_{th,n}^2 = \gamma^2 n^{-(\beta-1)} + r_0^2 n^{-(2\beta-1)}$, where $2\beta - 1 > \beta - 1 > 0$. Thus, it can be shown that $$\mathbb{P}\left(\chi(G_n) \to \left\lfloor \frac{1}{\beta-1} \right\rfloor + \frac{1}{2} \text{ or } \chi(G_n) \to \left\lfloor \frac{1}{\beta-1} \right\rfloor + \frac{1}{2} + 1\right) = 1.$$

The proof of Theorem 2 then follows from Lemmas 1, 3 and 4 and also the fact that the continuous function $$f(x) = \frac{1}{x}$$

preserves almost-sure convergence (continuous mapping theorem).

Impact of Rayleigh Fading on the Capacity Analysis:

One of the most important phenomena in wireless networks is the concept of channel fading. Even though fading seems to be a detrimental aspect of wireless networks, it can also be helpful if it is viewed in a careful way. Probably the most well-known example for this is receive diversity at multi-antenna receivers, where we can make use of independently faded signals to combine them in the best way, leading to an improvement in the received SNR.

Hence, it would be interesting to figure out how fading can affect the results we derived so far on the fraction of the capacity region that ITLinQ can achieve. In this document, some techniques are disclosed to solve this problem, considering the same model for the spatial location of the nodes as in Section II-B with the difference that, here, the techniques consider the squared magnitude of the channel gain at distance r to be $g_0 r^{-\alpha}$ where $g_0$ represents the Rayleigh fade of the channel modeled as an exponential random variable with normalized mean of 1. These techniques consider a slow fading scenario (i.e., block fading), where the rate of change of the channel characteristics is much smaller than the rate of change of the transmitted signal. Hence, the channel fade $g_0$ remains fixed during the transmission within each block of communication (which corresponds to a scheduling phase of ITLinQ) and changes i.i.d from one block to the next.

The information-theoretic independent set (ITIS) still remains the same as before, thus., within each block of communication with revisited channel gain values (modeled as $g_0 r^{-\alpha}$), a subset $S \subseteq \{1, \ldots, n\}$ in which for any link $i \in S$ condition (2) is satisfied is an ITIS in that block. Introducing Rayleigh fading into the channel model adds another source of randomness in the analysis of the fraction of the capacity region achieved by ITLinQ, which is due to the dependence of ITIS's on the random fade of the channels.

The techniques can still make use of Lemma 1 to characterize the fraction of the capacity region that ITLinQ can achieve in each block of communication when Rayleigh fading is also included in the channel model. In this case, the faded interference may no longer be Gaussian. For example, in a multi-user network, Gaussian noise is the worst case additive noise in the sense that any rate tuple that can be achieved under the assumption of Gaussian noise can also be achieved under non-Gaussian additive noise of the same variance.

Therefore, by treating the aggregate (non-Gaussian) noise plus faded interference at each destination as a Gaussian noise, implementations can achieve a lower bound on the achievable rate of ITLinQ. As a result, Lemma 1 would still hold in a fading scenario, meaning that in each block of communication ITLinQ can achieve a fraction $$\frac{1}{\kappa_n}$$

of the capacity region to within a gap of $$\frac{\log 3n}{\kappa_n},$$

where now $\kappa_n$, the minimum number of ITIS's whose union contains all the links, depends both on the spatial location of the links and the realization of the fading. Characterizing the distribution of $\kappa_n$ in the fading scenario (even in the asymptote of $n \to \infty$) is quite challenging, hence the rest of this section uses numerical evaluation to analyze the average fraction of the capacity that ITLinQ achieves in the fading scenario $$\left(\text{i.e., } E\left[\frac{\log 3n}{\kappa_n}\right]\right).$$

The same network model of Section II-B for the placement of the nodes (in which source nodes are distributed uniformly within a circle of radius R and each destination node is located within a distance $r_0 n^{-\beta}$ of its corresponding source node) can be considered and the average fraction of the capacity region that ITLinQ is able to achieve (to within a gap) for both cases of with and without Rayleigh fading can be evaluated. One example of results is illustrated is FIG. 11.

Figure 11:
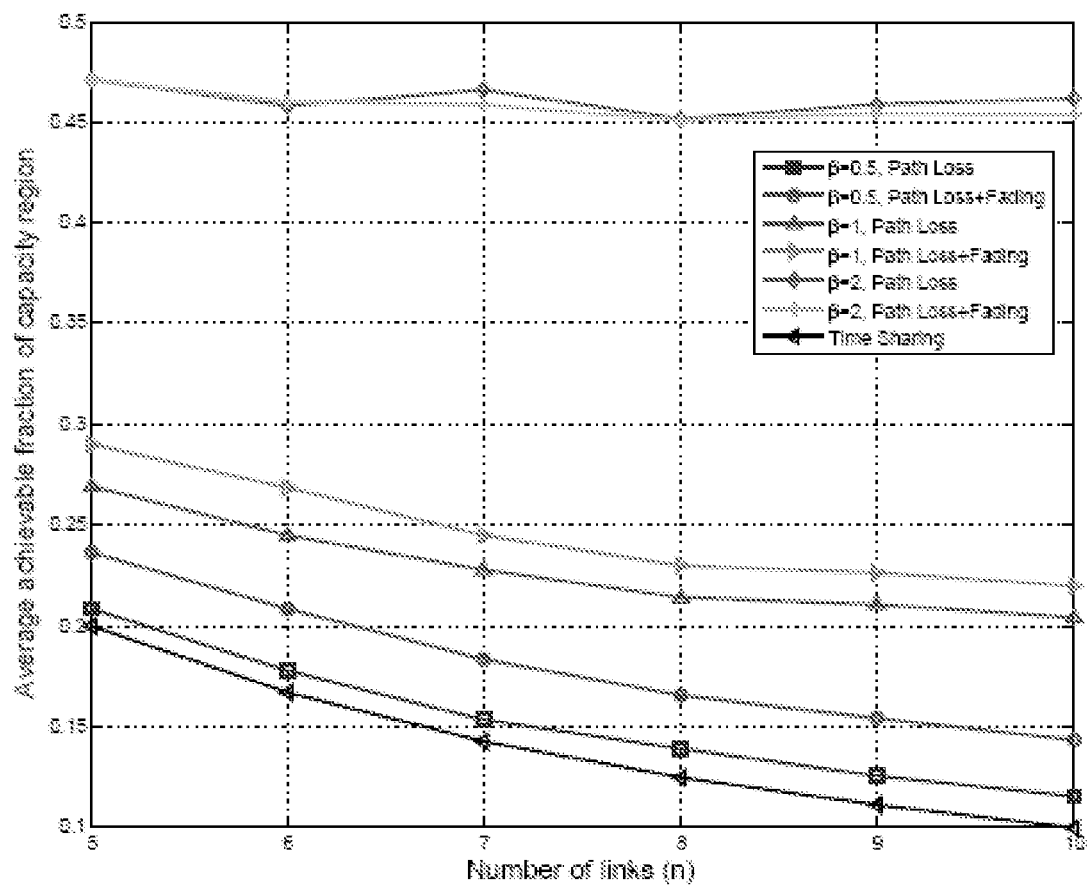
FIG. 11 shows an example of a graphical comparison of average achievable fraction of the capacity region by ITLinQ scheme with and without fading and comparison with time-sharing.

By considering FIG. 11, one can now compare the average fraction of the capacity region that ITLinQ achieves in the fading and non-fading scenario (both with the same average channel gains). There is an improvement in the case where Rayleigh fading is also included (in particular, for $\beta \leq 1$). The intuition behind this improvement can be explained as follows. Consider the ITIS condition (2) rewritten in the following form.

$$g_{ii} d_{S_i D_i}^{-\alpha} \geq \frac{P}{N} \max_{j \in S\setminus\{i\}} g_{ij} d_{S_j D}^{-\alpha}, \max_{k \in S\setminus\{i\}} g_{ki} d_{S_i D_k}^{-\alpha},$$

where $\forall i,j$, $g_{ij}$ is the exponential fading random variable of the channel between source j and destination i. For fixed power and noise levels and spatial distribution of the nodes in the network, condition (8) reveals the opportunity that fading is providing in this case. In fact, there are specific locations of nodes in the network for which condition (8) cannot be satisfied in a deterministic path-loss setting. However, numerical results show that the randomness due to the inclusion of Rayleigh fading can help this condition to be satisfied for more subsets of the links, resulting in an improvement in the achievable fraction of the capacity region. This can, therefore, be viewed as another case where fading is helpful in terms of the system performance. For the case of $\beta > 1$, since the destination nodes get very close to their corresponding source nodes, interference is already at a very low level and therefore fading cannot be of much help and may even degrade the performance by a small amount, as depicted in FIG. 11.

Finally, using Lemma 1, one can also quantify the gap to the fraction of the capacity region that ITLinQ is able to achieve in each block of communication to be $$\frac{\log 3n}{\kappa_n}.$$

Figure 12:
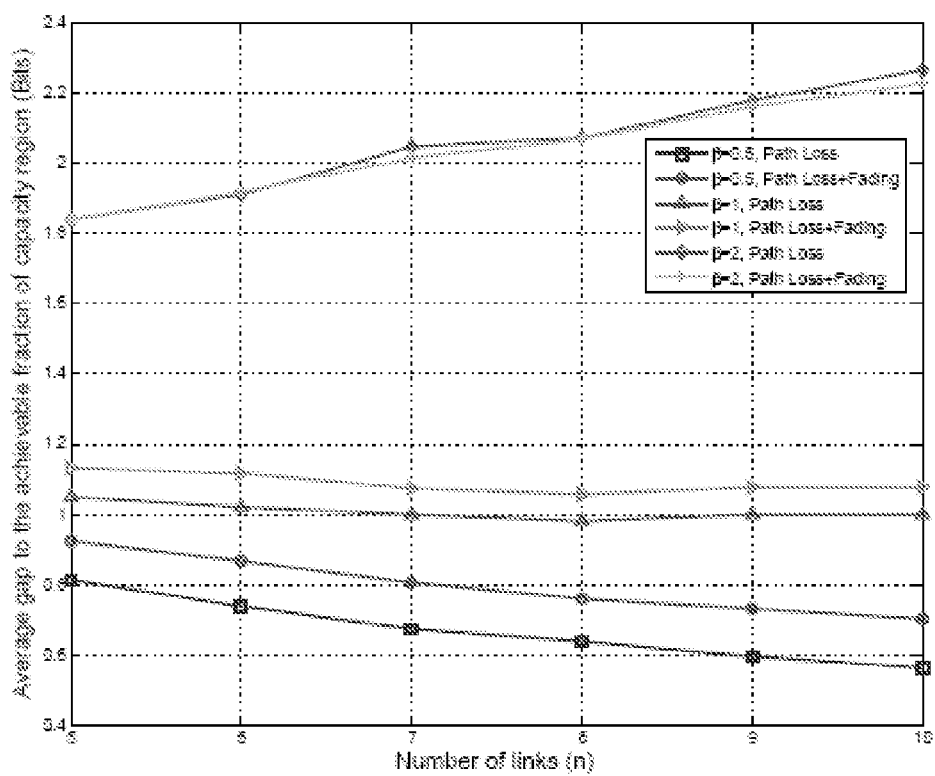
FIG. 12 shows an example of a graphical comparison of the average gap to the achievable fraction of the capacity region by ITLinQ with and without fading.

For the above network model, an implementation can numerically evaluate and plot the average gap $$\left(\text{i.e., } E\left[\frac{\log 3n}{\kappa_n}\right]\right)$$

in FIG. 12. Similar to the nonfading scenario of Section II-B, for the case of $\beta \leq 1$, the average gap again does not scale with the size of the network and always remains less than 1.2 bits, independent of the number of links. However, for the case of $\beta > 1$ where a constant fraction of the capacity region can be achieved asymptotically, the gap increases with the number of links and Theorem 2 predicts that the increase is logarithmic with respect to n.

III. A Distributed Algorithm for ITLinQ and its Comparison with FlashLinQ

In some embodiments, the ITLinQ technique disclosed in the present document has a complexity comparable to that of the FlashLinQ technique. However, for certain network scenarios, the performance of the ITLinQ technique can be significantly better that that of FlashLinQ.

A. Description of the Distributed ITLinQ Technique

As mentioned in Section II-A, the disclosed technology can be implemented in example wireless networks composed of n source-destination pairs. In each execution of the technique, to address the issue of fairness among the users, the users may be randomly permuted and reindexed from 1 to n based on the realization of the random permutation. This new indexing of the users corresponds to a priority order of the users: user i has higher priority than user j if i<j, $\forall i,j \in \{1, \ldots, n\}$. Then, user 1 is scheduled to transmit at the current time frame and for the remaining users, each user is scheduled if it does not cause and receive "too much" interference to and from the higher priority users. The conditions for defining the level of "too much" interference for user $j \in \{2, \ldots n\}$ are as follows, where $\eta$ is a design parameter, which may be called an interference exponent because it is used as an exponent of the SNR:

At $D_j$, the following conditions are satisfied:

$$INR_{ji} \leq SNR_j^\eta, \forall i < j, \quad (8)$$

which imply that destination j does not receive too much interference from higher-priority users.

At $S_j$, the following conditions are satisfied:

$$INR_{ij} \leq SNR_j^\eta, \forall i < j, \quad (9)$$

which imply that source j does not cause too much interference at higher-priority users.

There are at least two differences here with respect to the FlashLinQ scheduling conditions: The first difference is that instead of considering the raw fraction $$SIR = \frac{SNR}{INR},$$

here, an exponent for the SNR term is considered, based on the condition for the optimality of TIN (1). The second difference is that in condition (9), the outgoing interference of each user is compared to its own SNR rather than other users' SNR's. This is also inspired by the TIN-optimality condition (1).

Note that, if the parameter $\eta$ is set to $\eta=0.5$, then conditions (8) and (9) imply that the TIN-optimality condition (1) is satisfied at user j. This means that user j can safely be added to the information-theoretic independent subset of higher priority users and get scheduled to transmit in the current time frame. This technique, therefore, seeks to find the largest possible information-theoretic independent subset based on the priority ordering of the users.

However, selecting $\eta=0.5$ might be too pessimistic and restrictive, and may prevent some users which cause and receive low levels of interference from being scheduled. Therefore, this variable may be used as a design parameter, and tuning this parameter can indeed improve the achievable sum-rate by this scheduling technique.

The remaining question is: How can the sources and destinations check whether their pertinent conditions are satisfied? This can be done by, e.g., a simple signaling mechanism which is inspired by the FlashLinQ technique and is a two-phase process, in each of which it is assumed that each user uses its own frequency band and transmissions are interference-free.

In the first phase, all the sources transmit signals at their full power P. The destinations will then receive their own desired signals and also all the interfering signals in separate frequency bands. Afterwards, the destinations estimate their received SNR's and INR's and check if their desired conditions (8) are satisfied. This phase could be substantially the same as that of the FlashLinQ technique.

In the second phase, different from the "inverse power echo" mentioned in the FlashLinQ technique, the destinations also transmit signals at substantially the same power level P of the sources. Similar to the first phase, in this phase all the sources can estimate the value of their desired SNR's and INR's in order to verify the validity of condition (9).

For simulation purpose, a second tuning parameter M can be used, which adds more flexibility to the propose scheme. The parameter M may be called "interference coefficient." With the addition of this variable, conditions (8) and (9) will change to $INR_{ji} \leq MSNR_i^\eta$, $\forall i<j$ and $INR_{ij} \leq MSNR_i^\eta$, $\forall i<j$, respectively. We will set M to be equal to 25 dB. As showed herein, the complexity of this distributed signaling mechanism is completely comparable to that of the FlashLinQ technique.

FIG. 13 depicts an example code listing that shows an implementation of the distributed ITLinQ algorithm. For concreteness, the algorithm used in this section for the performance evaluation of distributed ITLinQ is illustrated in pseudo-code format in Algorithm 1. Here, it is assumed that through multiple iterations of the training mechanism introduced in Section III, each link is aware of the values of its own SNR and all its incoming and outgoing INR's and it is also aware of the active higher-order links. It is assumed that the knowledge of the active higher-order links is also available to each link in implementing the FlashLinQ scheme. For the implementation of ITLinQ distributively, a second tuning parameter M is used, which adds more flexibility to the scheme. This parameter can in general be tuned to optimize the performance of the algorithm in any network setting. For the results of this section, M is set to be equal to 25 dB. Algorithm 1 returns a vector active of length n which specifies whether or not each link should be scheduled. In particular, for any $j \in \{1, \ldots, n\}$, link j is scheduled if and only if active(j)=1.

B. Performance Comparison of the distributed ITLinQ and FlashLinQ

Figure 14:
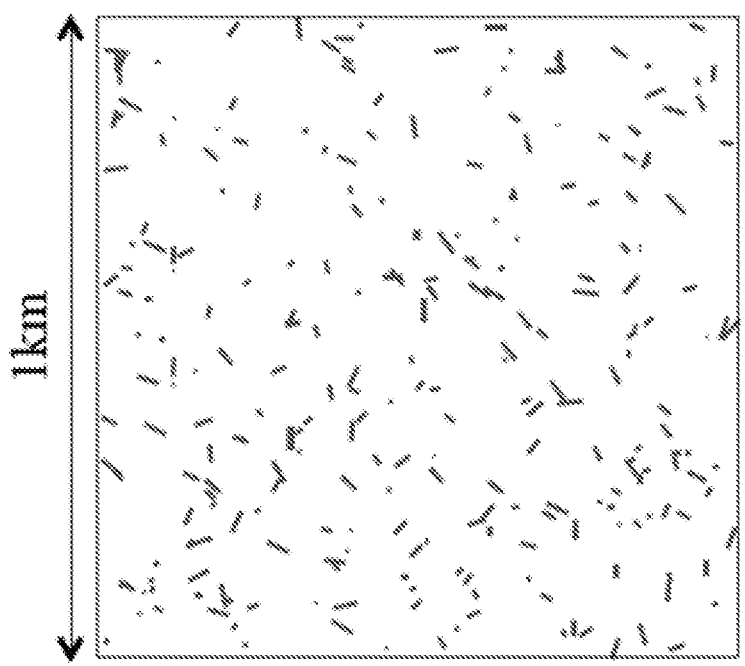
FIG. 14 shows an example simulation network in which multiple transmitters are operating.

The performance of the disclosed distributed technique was numerically simulated and compared with that of the FlashLinQ technique through numerical analysis. For the test scenario, an example embodiment that includes n links randomly located in a 1 km×1 km square is considered. FIG. 14 shows an example configuration of this test network. The length of each link, which is the distance between its corresponding source and destination, is taken to be a uniform random variable in the interval [2.65m]. The simulation uses a carrier frequency of 2.4 GHz and a bandwidth of 5 MHz. The noise power spectral density is considered to be −184 dBm/Hz. The transmit power is set to 20 dBm. Moreover, the channel follows the LoS model in ITU-1411 with antenna heights of 1.5 m, alongside with a log-normal shadowing with standard deviation of 10 dB. The antenna gain per device is taken to be −2.5 dB and the noise figure is assumed to be 7 dB.

Figure 15:
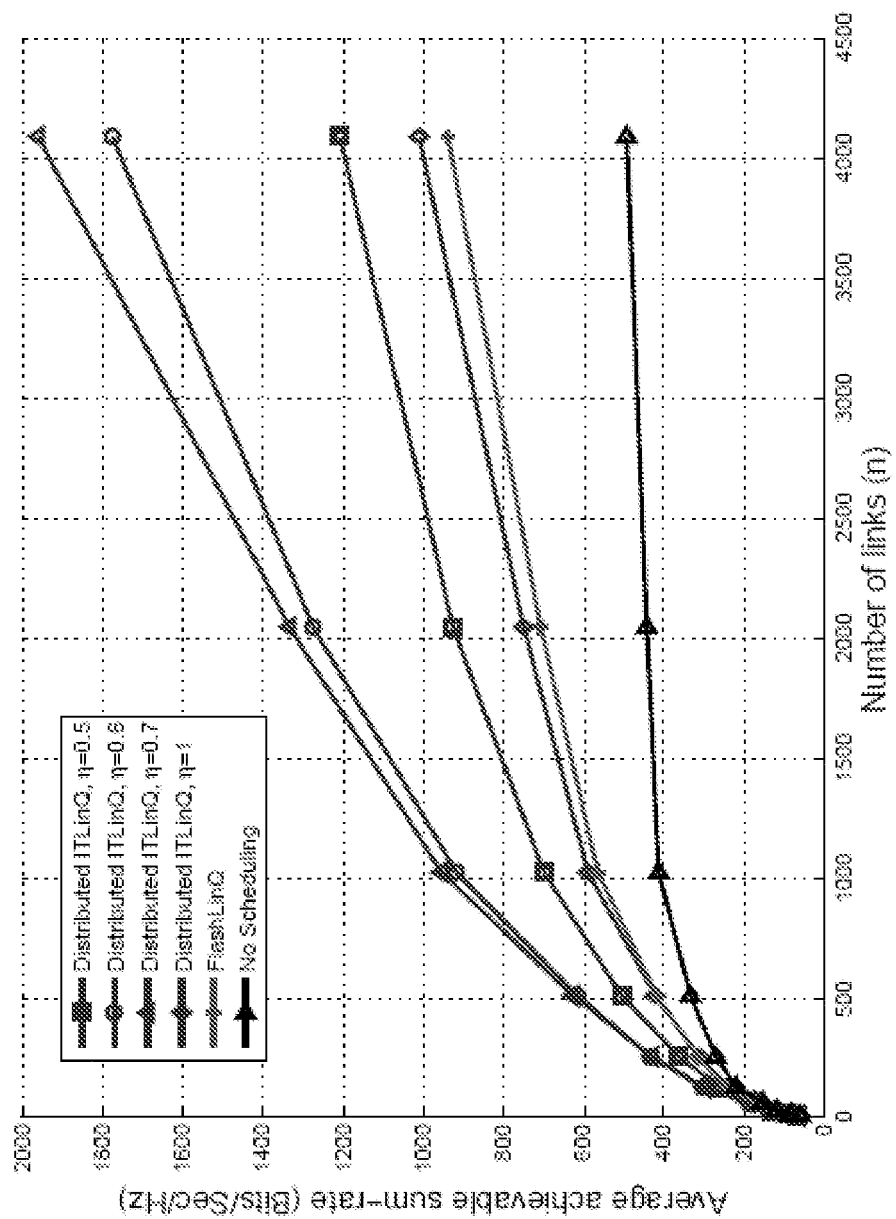
FIG. 15 shows a performance comparison of distributed ITLinQ with FlashLinQ and no scheduling.

FIG. 15 shows an example performance comparison of distributed ITLinQ with FlashLinQ.

As FIG. 15 illustrates, tuning the parameter $\eta$ can lead to considerable gains over FlashLinQ. For the case of $\eta=0.5$, in which conditions (8) and (9) are sufficient for the optimality of TIN (to within a constant gap), distributed ITLinQ exhibits over 28% gain over FlashLinQ for 4096 users. Interestingly, setting $\eta=0.7$ results in more than 110% gain over FlashLinQ for 4096 users. However, as we increase $\eta$ to 1, more and more users get scheduled which results in a degradation in the overall performance. As a baseline, the achievable sum-rate when there is no scheduling (i.e., all the links transmit simultaneously) is also plotted.

Figure 16:
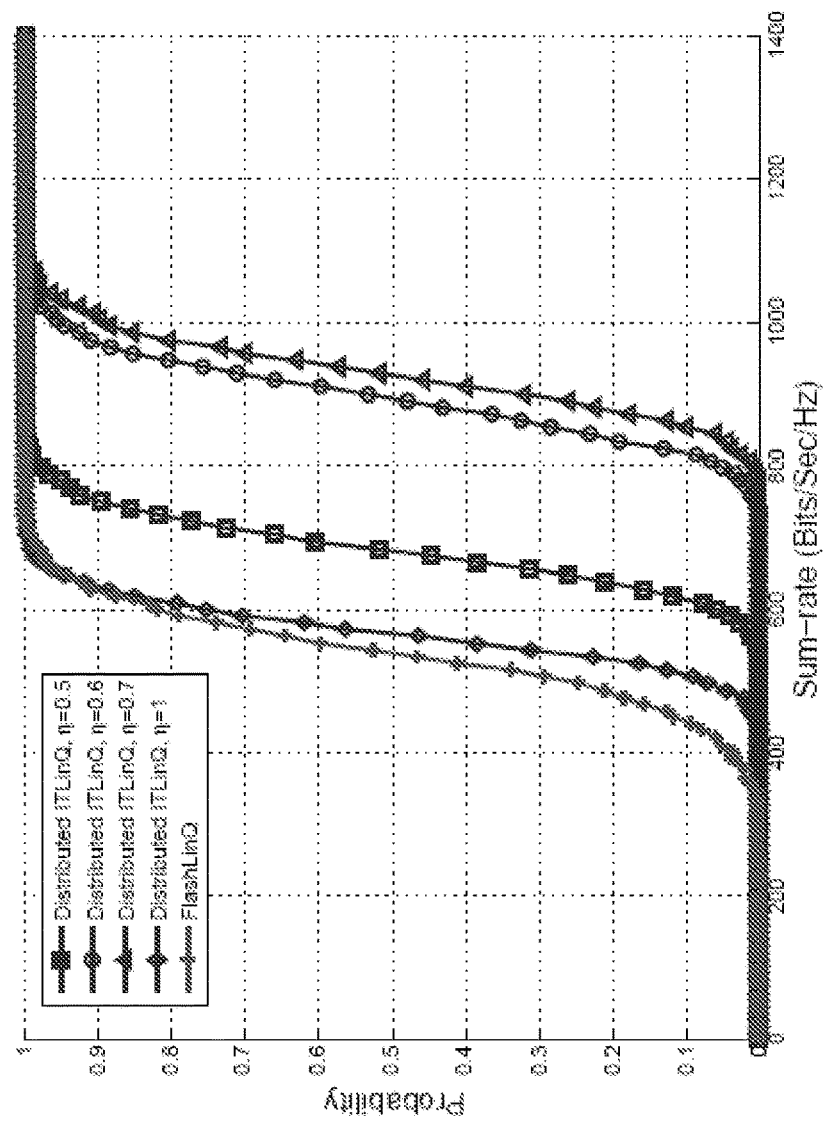
FIG. 16 shows comparison of the cumulative distribution function of the sum-rate achieved by distributed ITLinQ and FlashLinQ.

FIG. 16 shows an example of comparison of the cumulative distribution function (CDF) of the sum-rate achieved by distributed ITLinQ and FlashLinQ in a network of 1024 users.

The same trend can be seen in FIG. 16, showing that distributed ITLinQ, especially for the value of $\eta=0.7$, can result in considerable uniform gain compared to the sum-rate achievable by FlashLinQ. For instance, with 50% probability, the sum-rate achieved by FlashLinQ is less than 540 bits/sec/Hz while with the same probability, the sum-rate achieved by distributed ITLinQ is less than 928 bits/sec/Hz.

Figure 17:
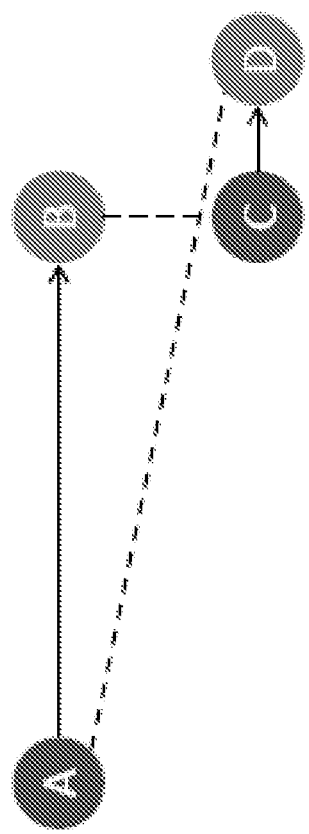
FIG. 17 shows an example of the case where distributed ITLinQ may be unfair.

Another natural aspect of distributed scheduling schemes that is of considerable usefulness is the issue of fairness among the links. In particular, the scheduling scheme should take care of all links fairly, regardless of them being strong or weak. It can be seen that, in some embodiments, the distributed ITLinQ scheme favors strong links more than weak links. To highlight this issue, a network with two links AB and CD is shown in FIG. 17. In this figure, link AB is a low-SNR link and link CD is a high-SNR link. Moreover, Destination node B suffers from strong interference due to the source node C. To see why ITLinQ may be unfair in such a scenario regardless of the priority of the links, consider the following two cases:

If link AB has a lower priority than link CD, link CD is first scheduled. Then, destination B checks its scheduling condition $INR_{BC} \leq MSNR_{BA}^\eta$ and with a high probability may find that it is not satisfied (since the interference from C is strong compared to the signal power received from A). This will prevent link AB from being scheduled.

If link AB has a higher priority than link CD, it will be scheduled first. Then, since both destination node D is receiving a low amount of interference from A (compared to the signal power from D) and source node C is causing a low amount of interference at B (compared to the signal power it delivers to D), link CD will also get scheduled and hurts the transmission of link AB.

Therefore, in both cases, the low-SNR link AB will not get a high rate, if any. This motivates a modification of the distributed ITLinQ scheme to account for this issue. To this end, the inventors came up with a fair version of distributed ITLinQ as follows. Inspired by the example in FIG. 17, in the fair ITLinQ algorithm, the high-SNR links should get scheduled in a more restrictive way. This can be done by decreasing the parameters η (and/or M) in the scheduling condition for the outgoing interference of high-SNR links. In general, η (and M) are a smoothly descending function of SNR. However, one simple solution would be to choose a threshold $SNR_{th}$ such that if the SNR of a link is higher than this threshold, η and M are altered to decreased values $\bar{\eta}$ and $\bar{M}$, or make η and M as having a step function instead of a smooth function of SNR. The pseudo-code for the fair ITLinQ scheme is presented in Algorithm 2 example shown in FIG. 18. To assess the performance of fair ITLinQ in terms of fairness, we have numerically evaluated the CDF of the link rates (averaged over both priorities and locations) for a network with 1024 links under the same model as the one mentioned in the beginning of this Section. The threshold value for high-SNR is chosen to be $SNR_{th}$=110 dB and the modified parameters are set to $\bar{\eta}$=0.6 and $\bar{M}$=20 dB.

Figure 19:
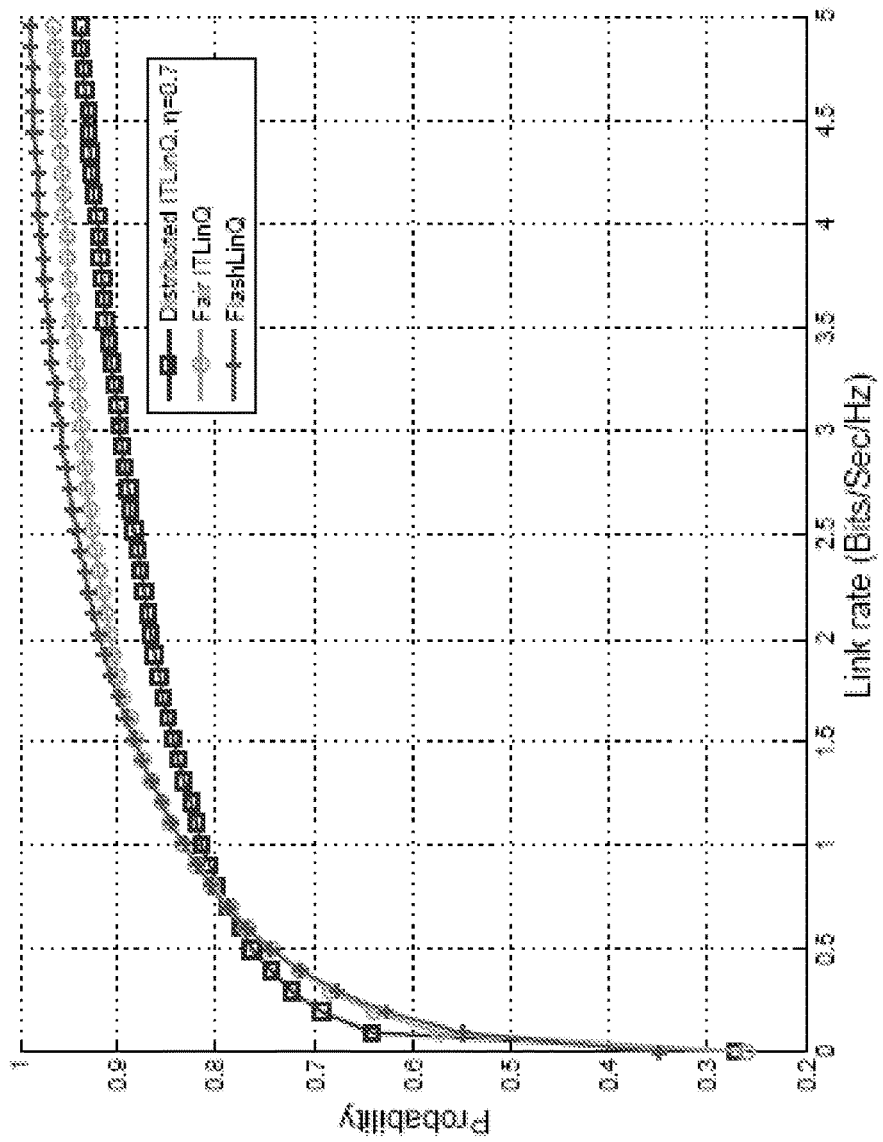
FIG. 19 shows a graphical example of the average link rate CDF of distributed ITLinQ, fair ITLinQ and FlashLinQ for a network with 1024 links.

FIG. 19 compares the CDF of the average link rate by distributed ITLinQ (with η=0.7), fair ITLinQ and FlashLinQ. As the figure illustrates, fair ITLinQ can improve the tail distribution of distributed ITLinQ and perform as well as FlashLinQ in terms of fairness. This certainly does not come for free and in fact, there is a trade-off between fairness and the achievable sum-rate.

Figure 20:
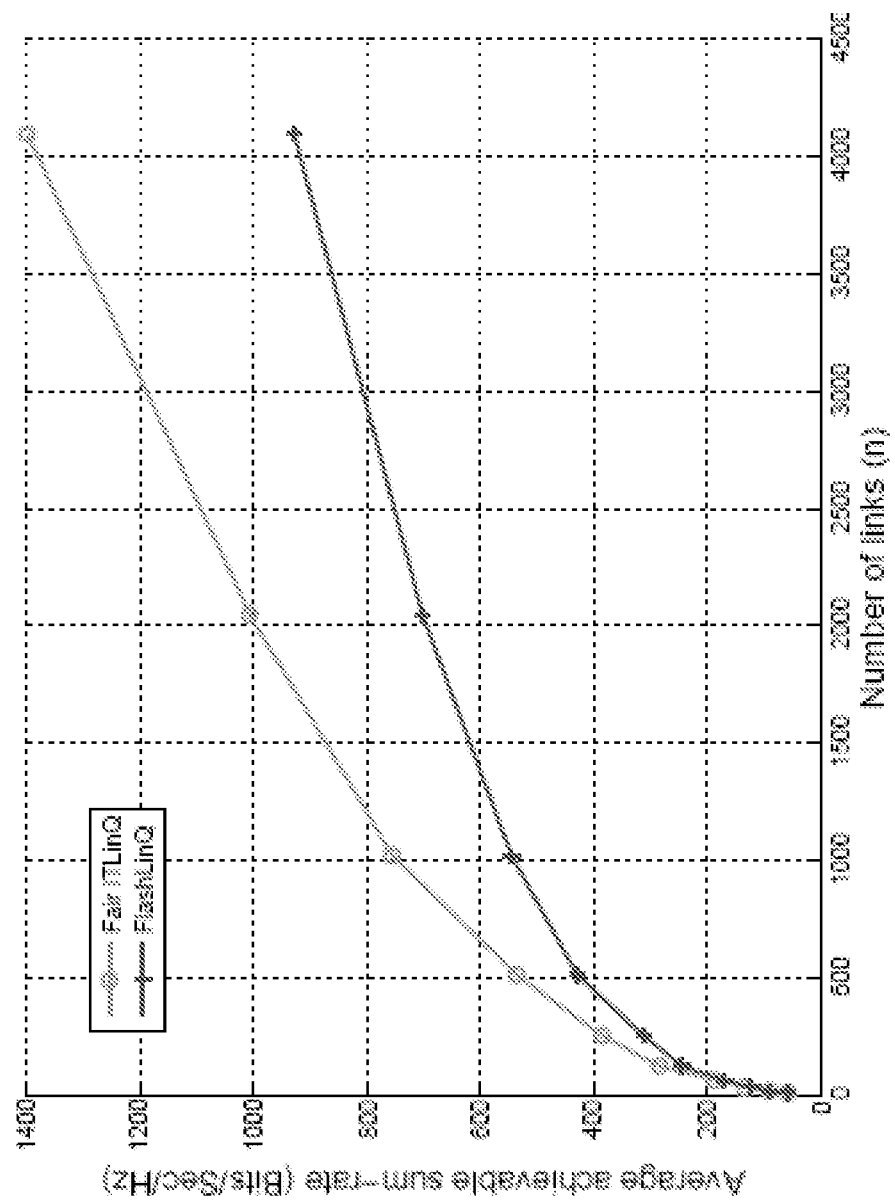
FIG. 20 shows an example of comparison of sum-rate achieved by the fair ITLinQ and FlashLinQ techniques.

The sum-rate achieved by fair ITLinQ is compared with FlashLinQ in the example graph depicted in FIG. 20. As illustrated in FIG. 20, for the case of 4096 links, the sum-rate gain of fair ITLinQ over FlashLinQ is more than 50%.

Figure 21:
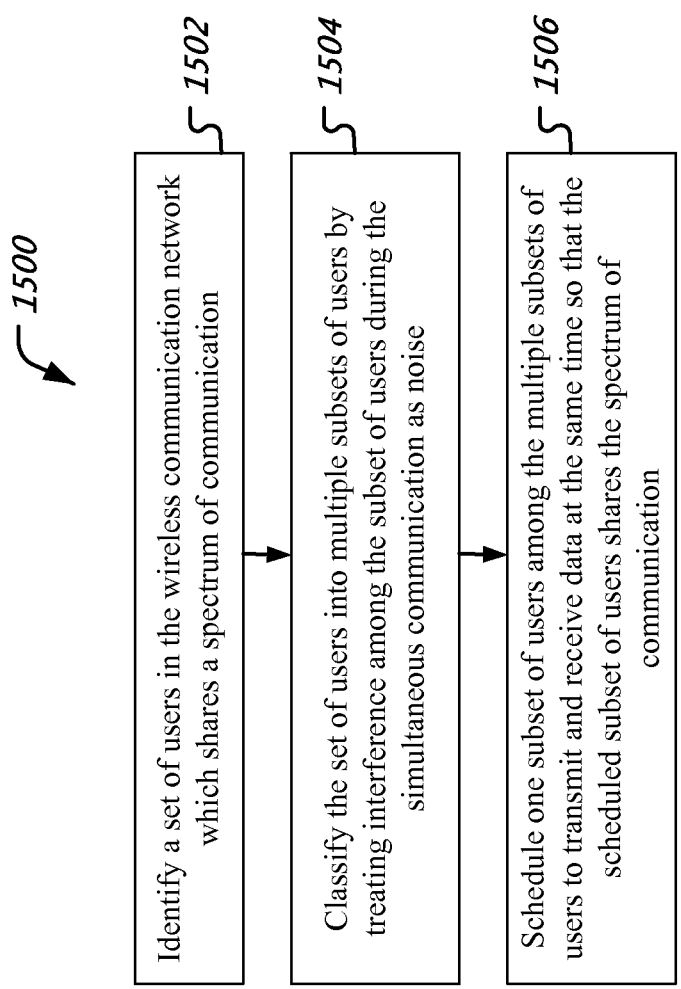
FIG. 21 shows an example method of wireless communication.

FIG. 21 shows an example of a method 1500 for managing spectrum sharing in a wireless communication network. The method 1500 may be implemented at a server or another device in the wireless communication network.

The method 1500 includes, at 1502, identifying a set of devices in the wireless communication network which are allowed to share a spectrum of communication. The identification may be based on physical location of the devices. The set of devices that are users of the wireless spectrum may comprise, e.g., all users(devices) that are currently being served by a same base station and thus potentially mobile to cause interference with each other's transmissions. In some implementations, e.g., in device-to-device communication, at least some of the devices may be permanently or semi-permanently stationary. A server in the wireless communication network may receive location information for each device and may keep track of which devices are currently in the potential set of non-interfering devices.

The method 1500 includes, at 1504, classifying the set of devices into multiple subsets of users. Each subset of users in the multiple subsets of users is determined such that during simultaneous communication within the subset of users and when treating interference among the subset of users during the simultaneous communication as noise, an information-theoretically-optimal condition is achieved for the simultaneous communication among the subset of users. One such criterion, disclosed in this document, includes determining, for each device, that the desired channel strength is at least the sum of the strengths of the strongest interference from that user and the strongest interferer to that user (all in dB scale). In one aspect, when this condition is met, the users are considered non-conflicting and the subset of users can be shown to be able to achieve its information-theoretic capacity region (to within a constant gap) by simply treating interference as noise at the receivers.

The method 1500 includes, at 1506, scheduling, within a given time slot, one subset of users among the multiple subsets of users to transmit and receive data at the same time so that the scheduled subset of users shares the spectrum of communication. As disclosed in this document, in some implementations, the set of users is comprised of n source-destination pairs, and each subset of users is comprised of a subset of the n source-destination pairs. In some implementations, a distance threshold is determined for a configuration such that when two users are at a distance that is greater that the distance threshold away from each other, then the two users are in a same subset. See, e.g., discussion with respect to Lemma 2 in the present document. The distance threshold may be a function of the number of users in the set, value of the radius within which all devices in the set are present and the distance to a destination device.

In some implementations, the scheduling may prioritize transmission scheduling over a link from a source node to a receiver node based on a signal to noise ratio of a link between the source node and the receiver node. and a design parameter that controls an efficiency of the scheduling. Some examples of design parameters include the M and η parameters disclosed in the present document. In some implementations, the prioritizing uses a fairness scheme. For example, as described with reference to Algorithm 2 listed in FIG. 18, when the signal to noise ratio of the link is above a threshold value, then the design parameter M and/or η is changed to change the prioritization of the link, typically to reduce the prioritization.

In some implementations, the wireless communication network may be a device to device communication network in which the users are close together and use their direct channel instead of the regular communication through the base station.

Figure 22:
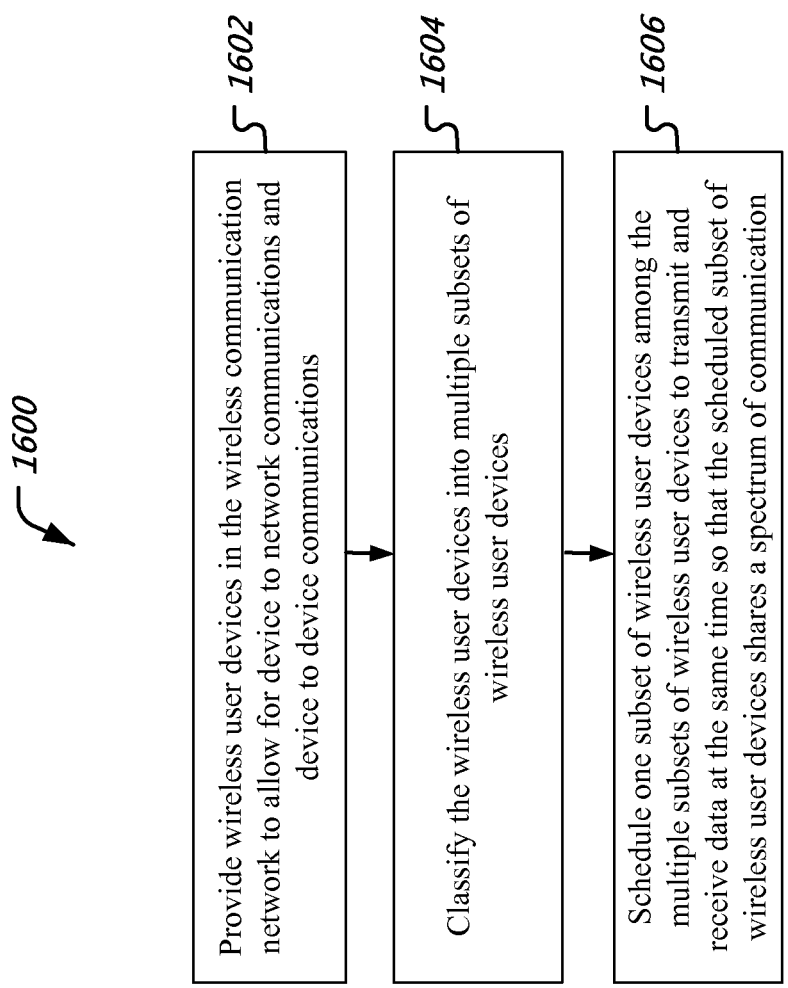
FIG. 22 shows an example method of device to device wireless communication.

FIG. 22 is an example flowchart of a method 1600 of device to device communications in a wireless communication network. In device to device communication, at least some devices may be pre-programmed for communication and may be operating in a distributed fashion and without explicit user interaction from a user interface during the operation.

The method 1600 includes, at 1602, providing wireless user devices in the wireless communication network to allow for device to network communications and device to device communications. A user or an operator of the network may install user devices for device to device communication. Some examples of such devices include smartphones, sensors, controllers, gas or electric meters, and so on.

The method 1600 includes, at 1604, classifying the wireless user devices into multiple subsets of wireless user devices by selecting wireless user devices in each subset based on the signal to noise and interference to noise ratios during simultaneous communication among the subset of users where the signal to noise ratio level is no less than the sum of the strongest incoming interference-to-noise ratio and the strongest outgoing interference-to-noise ratio.

The method 1600 includes, at 1606, scheduling, within a given time slot, one subset of wireless user devices among the multiple subsets of wireless user devices to transmit and receive data at the same time so that the scheduled subset of wireless user devices shares a spectrum of communication. As disclosed in the present document, in some implementations, two devices are considered to belong to the same subset, called an information theoretic independent set (ITIS), when transmissions from these devices do not interfere with each other in an information theoretic sense. For example, one criteria for classifying devices into the ITIS, in which the transmissions from a far end device are non-conflicting, is to check for the condition whether for any user in the subset, the SNR (Signal to Noise Ratio) level is no less than the sum of its strongest incoming interference-to-noise ratio (INR) and its strongest outgoing INR (all measured in dB scale).

In some implementations, an apparatus for wireless communication includes a memory in which computer-executable instructions are stored. The apparatus further includes a processor that reads the instructions from the memory and implements the method 1500 or 1600.

This document discloses a new scheduling scheme, called information-theoretic link scheduling (ITLinQ), in order to manage the interference in D2D communications in wireless networks. The scheme relies on the recently found optimality condition for treating interference as noise and at each time, schedules a subset of users in which treating interference as noise is information-theoretically optimal (to within a constant gap). A technique for performance guarantee of the ITLinQ scheme is provided by characterizing the fraction of the capacity region that it is able to achieve in a specific network setting. A distributed way is provided for implementing the ITLinQ scheme and this technique can yield, based on numerical analysis, considerable gains over FlashLinQ, a similar recently-proposed scheduling technique.

In some implementations, a central coordinating device may schedule periodic signal transmissions from wireless devices in a network to assess which devices belong to the same ITIS. For example, when instructed, a wireless device or a group of wireless devices may transmit a reference signal, while other devices may make measurements of the strength and quality of these reference signal transmissions. Control messages may be transmitted between the central coordinator and the wireless device carrying information about ITIS formation and/or transmission opportunity grants. The central coordinator may be, e.g., located at a base station in a cellular communication network.

Proof of Corollary 1

In the closest-AP selection model, n sources and n destinations are uniformly and independently located within a circle of radius R on the plane and then each destination is associated with its closest source. If there are n points (sources) located uniformly within a circle of radius R, then the probability that the minimum distance of a new point (destination) in the circle to the closest source, denoted by rmin, is greater than a threshold d is equal to $$\mathbb{P}(r_{min} > d) = \mathbb{P}(\text{no } BS \text{ within distance } d \text{ of the destination}) \quad (10)$$

$$= \left(\frac{\pi R^2 - \pi d^2}{\pi R^2}\right)^n \quad (11)$$

-continued $$= \left(1 - \left(\frac{d}{R}\right)^2\right)^n. \quad (12)$$

Denote the distance of destination i to its closest source as $r_i$. Then the probability that all the destinations are within a distance $d = Rn^{-\beta}$ of their corresponding sources can be lower bounded as $$\mathbb{P}\left[\max_i r_i \le d\right] = \mathbb{P}[r_1 \le d \ \& r_2 \le d \ \& \dots \ \& r_n \le d] \quad (13)$$

$$= 1 - \mathbb{P}[r_1 > d \text{ or } r_2 > d \text{ or } \dots \text{ or } r_n > d] \ge$$

$$1 - n\mathbb{P}[r_1 > d]$$

$$= 1 - n\left(1 - \left(\frac{d}{R}\right)^2\right)^n$$

$$= 1 - n\left(1 - \frac{1}{n^{2\beta}}\right)^n, \quad (14)$$

where in (13), we have used the union bound and the fact that ri's are identically distributed. If $\beta < \frac{1}{2}$ it is easy to show that the expression in (14) goes to 1 as n goes to infinity because of the following lower bound:

$$1 - \frac{n}{e^{n^{1-2\beta}}} \le 1 - n\left(1 - \frac{1}{n^{2\beta}}\right)^n, \quad (15)$$

which goes to 1 as n goes to infinity if $2\beta < 1$. Hence, the closest-AP selection model is almost-surely a special class of the model mentioned in Section II-B for any $\beta < \frac{1}{2}$. Moreover, in this case the first part of Theorem 2 shows that ITLinQ can almost-surely achieve a fraction of the capacity region proportional to $n^{\beta_1}$. Therefore, in the closest-AP selection model, ITLinQ is able to almost-surely achieve a fraction $$\lambda = \frac{\sqrt{3} \pi R^2}{2\gamma^2} n^{\beta - 1}$$

of the capacity region to within a gap of $$k \le \frac{\sqrt{3} \pi R^2}{2\gamma^2} \frac{\log 3n}{n^{1-\beta}}$$

when $n \to \infty$, for any $\beta < \frac{1}{2}$.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A method for managing spectrum sharing in a wireless communication network, the method comprising:
   identifying a set of devices in the wireless communication network which shares a spectrum of communication;
   classifying a set of users into multiple subsets of users such that each user in a subset meets an information-theoretically-optimal condition during simultaneous communication among the users in the subset and when treating interference among the users in the subset during the simultaneous communication as noise, wherein the information-theoretically-optimal condition requires a desired channel strength, in logarithmic scale, of a user in the subset to be at least the sum of strengths of the strongest interference from that user, in logarithmic scale, and the strongest interference to that user, in logarithmic scale; and
   scheduling, within a given time slot, one subset of users among the multiple subsets of users to transmit and receive data using the spectrum of communication at the same time so that the scheduled subset of users shares the spectrum of communication.

2. The method of claim 1, wherein the set of users is composed of n source-destination pairs, and each subset of users is a subset of the n source-destination pairs, where n is an integer.

3. The method of claim 1, wherein the wireless communication network is a device-to-device (D2D) communication system.

4. The method of claim 1, wherein the scheduling comprises:
   prioritizing transmission scheduling over a link from a source node to a receiver node based on a signal to noise ratio of a link between the source node and the receiver node and a design parameter that controls an efficiency of the scheduling.

5. The method of claim 4, wherein the prioritizing uses a fairness scheme in which, when the signal to noise ratio of the link is above a threshold value, then the design parameter is changed to reduce prioritization of the link.

6. The method of claim 1, further including:
   determining a distance threshold such that when two users are at a distance that is greater that the distance threshold away from each other, then the two users are in a same subset.

7. An apparatus for wireless communication, comprising:
   a memory that stores computer-executable instructions; and
   a processor that reads the instructions from the memory and implements a method for managing spectrum sharing in a wireless communication network, the method comprising:
   identifying a set of users in the wireless communication network which shares a spectrum of communication;
   classifying the set of users into multiple subsets of users such that each user in a subset meets an information-theoretically-optimal condition during simultaneous communication among the users in the subset and when treating interference among the users in the subset during the simultaneous communication as noise, wherein the information-theoretically-optimal condition requires a desired channel strength of a user in the subset to be at least the sum of strengths of the strongest interference from that user and the strongest interference to that user; and
   scheduling, within a given time slot, one subset of users among the multiple subsets of users to transmit and receive data at the same time so that the scheduled subset of users shares the spectrum of communication.

8. The apparatus of claim 7, wherein the set of users is composed of n source-destination pairs, and each subset of users is a subset of the n source-destination pairs, where n is an integer.

9. The apparatus of claim 7, wherein the wireless communication network is a device-to-device (D2D) communication system.

10. The apparatus of claim 7, wherein the scheduling comprises:
    prioritizing transmission scheduling over a link from a source node to a receiver node based on a signal to noise ratio of a link between the source node and the receiver node and a design parameter that controls an efficiency of the scheduling.

11. The apparatus of claim 10, wherein the prioritizing uses a fairness scheme in which, when the signal to noise ratio of the link is above a threshold value, then the design parameter is changed to reduce prioritization of the link.

12. The apparatus of claim 7, wherein the method further includes:
    determining a distance threshold such that when two users are at a distance that is greater that the distance threshold away from each other, then the two users are in a same subset.

13. A method for device to device communications in a wireless communication network, comprising:
    providing wireless user devices in the wireless communication network to allow for device to network communications and device to device communications;
    classifying the wireless user devices into multiple subsets of non-conflicting devices such that each wireless user device in a subset belongs to an information theoretic independent set and meets an information-theoretically-optimal condition, wherein the information theoretic independent set requires a direct signal strength of each wireless user device, in logarithmic scale, in the subset to be at least the sum of the strongest incoming interference to that user, in logarithmic scale, and the strongest outgoing interference, in logarithmic scale, from that user in a spectrum of communication; and
    scheduling, within a given time slot, one subset of wireless user devices among the multiple subsets of wireless user devices to transmit and receive data using the spectrum of communication at the same time so that the scheduled subset of wireless user devices shares the spectrum of communication.

14. The method of claim 13, wherein the set of users is composed of n source-destination pairs, and each subset of users is a subset of the n source-destination pairs, where n is an integer.

15. The method of claim 13, further including:
determining a distance threshold such that when two users are at a distance that is greater that the distance threshold away from each other, then the two users are in a same subset.

16. The method of claim 13, wherein the scheduling comprises:
prioritizing transmission scheduling over a link from a source node to a receiver node based on a signal to noise ratio of a link between the source node and the receiver node and a design parameter that controls an efficiency of the scheduling.

17. The method of claim 16, wherein the prioritizing uses a fairness scheme in which, when the signal to noise ratio of the link is above a threshold value, then the design parameter is changed to reduce prioritization of the link.

18. An apparatus for wireless communication, comprising:
a memory that stores computer-executable instructions; and
a processor that reads the instructions from the memory and implements a method for wireless communications, comprising:
providing wireless user devices in the wireless communication network to allow for device to network communications and device to device communications;
classifying the wireless user devices into multiple subsets of wireless user devices by selecting wireless user devices in each subset while treating signal interference as noise during simultaneous communication among the wireless user devices in each subset such that each wireless user device in a subset belongs to an information theoretic independent set, wherein the information theoretic independent set requires a signal to noise ratio level of each wireless user devices in the subset to be no less than the sum of the strongest incoming interference-to-noise ratio and the strongest outgoing interference-to-noise ratio; and
scheduling, within a given time slot, one subset of wireless user devices among the multiple subsets of wireless user devices to transmit and receive data at the same time so that the scheduled subset of wireless user devices shares a spectrum of communication.

19. The method of claim 18, wherein the set of users is comprised of n source-destination pairs, and each subset of users is comprised of a subset of the n source-destination pairs.

20. The method of claim 18, further including:
determining a distance threshold such that when two users are at a distance that is greater that the distance threshold away from each other, then the two users are in a same subset.

* * * * *

UNITED STATES PATENT AND TRADEMARK OFFICE
CERTIFICATE OF CORRECTION

PATENT NO. : 10,200,873 B2
APPLICATION NO. : 15/038433
DATED : February 5, 2019
INVENTOR(S) : Amir Salman Avestimehr et al.

It is certified that error appears in the above-identified patent and that said Letters Patent is hereby corrected as shown below:

In the Specification

In Column 3, Line 1, delete "shows comparison" and insert -- shows a comparison --, therefor.

In Column 5, Line 20, delete "such as" and insert -- such a --, therefor.

In Column 7, Line 49, delete "Ri=log(1+SINR$_i$)," and insert -- R$_i$=log(1+SINR$_i$), --, therefor.

In Column 9, Line 17, delete "destination Di" and insert -- destination D$_i$ --, therefor.

In Column 9, Line 19, delete "source Si" and insert -- source S$_i$ --, therefor.

In Column 9, Line 41, delete "," after equation and insert the same at Line 43 after equation.

In Column 15, Line 39, delete "illustrated is" and insert -- illustrated in --, therefor.

In Column 16, Line 36, delete "better that that" and insert -- better than that --, therefor.

In Column 17, Line 47, delete "propose scheme." and insert -- proposed scheme. --, therefor.

In Column 18, Line 48, delete "FlashLinQ" and insert -- <u>FlashLinQ</u> --, therefor.

In Column 18, Line 50, delete "ITLinQ" and insert -- <u>ITLinQ</u> --, therefor.

In Column 20, Lines 23-24, delete "greater that the" and insert -- greater than the --, therefor.

In Column 20, Line 33, delete "node. and" and insert -- node and --, therefor.

In Column 21, Line 60, delete "rmin," and insert -- r$_{min}$, -= --, therefor.

Signed and Sealed this
Seventeenth Day of September, 2019

Andrei Iancu
*Director of the United States Patent and Trademark Office*

In Column 22, Line 24, delete "ri's" and insert -- $r_i$'s --, therefor.

In the Claims

In Column 23, Line 58, in Claim 6, delete "greater that" and insert -- greater than --, therefor.

In Column 24, Line 39, in Claim 12, delete "greater that" and insert -- greater than --, therefor.

In Column 25, Line 3, in Claim 15, delete "greater that" and insert -- greater than --, therefor.

In Column 26, Line 24, in Claim 20, delete "greater that" and insert -- greater than --, therefor.